(12) United States Patent
Yu et al.

(10) Patent No.: US 11,857,935 B2
(45) Date of Patent: *Jan. 2, 2024

(54) ZIEGLER-NATTA CATALYST SYSTEM HAVING A THERMALLY TREATED MAGNESIUM CHLORIDE COMPONENT

(71) Applicant: Dow Global Technologies LLC, Midland, MI (US)

(72) Inventors: Mingzhe Yu, Midland, MI (US); David Gordon Barton, Midland, MI (US); Kurt F. Hirsekorn, Sugar Land, TX (US); Sadeka Onam, Midland, MI (US); Peter N. Nickias, Midland, MI (US); Andrew T. Heitsch, Angleton, TX (US); Thomas H. Peterson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 413 days.

This patent is subject to a terminal disclaimer.

(21) Appl. No.: 17/056,534

(22) PCT Filed: May 23, 2019

(86) PCT No.: PCT/US2019/033706
§ 371 (c)(1),
(2) Date: Nov. 18, 2020

(87) PCT Pub. No.: WO2019/231815
PCT Pub. Date: Dec. 5, 2019

(65) Prior Publication Data
US 2021/0205785 A1    Jul. 8, 2021

Related U.S. Application Data

(60) Provisional application No. 62/679,305, filed on Jun. 1, 2018.

(51) Int. Cl.
| | | |
|---|---|---|
| *C08F 4/646* | (2006.01) | |
| *C08F 4/657* | (2006.01) | |
| *B01J 3/00* | (2006.01) | |
| *B01J 21/06* | (2006.01) | |
| *B01J 20/04* | (2006.01) | |
| *B01J 31/14* | (2006.01) | |
| *B01J 35/10* | (2006.01) | |
| *C08F 2/06* | (2006.01) | |
| *C08F 4/02* | (2006.01) | |
| *C08F 210/16* | (2006.01) | |
| *C08F 4/685* | (2006.01) | |

(52) U.S. Cl.
CPC ........... *B01J 21/063* (2013.01); *B01J 20/046* (2013.01); *B01J 31/143* (2013.01); *B01J 35/1019* (2013.01); *C08F 2/06* (2013.01); *C08F 4/022* (2013.01); *C08F 4/6576* (2013.01); *C08F 4/6574* (2013.01); *C08F 4/685* (2013.01); *C08F 210/16* (2013.01); *C08F 2410/03* (2013.01)

(58) Field of Classification Search
CPC ...... C08F 4/6574; C08F 4/6576; C08F 4/685; C08F 10/00; B01J 31/00; B01J 31/36
See application file for complete search history.

(56) References Cited

U.S. PATENT DOCUMENTS

| | | | |
|---|---|---|---|
| 4,097,409 A | 6/1978 | Speakman | |
| 4,120,820 A | 10/1978 | Birkelbach | |
| 4,224,186 A | 9/1980 | Lowery et al. | |
| 4,308,369 A | 12/1981 | Shipley et al. | |
| 4,380,508 A | 4/1983 | Shipley et al. | |
| 4,399,054 A * | 8/1983 | Ferraris ................... | C08F 10/00 526/124.8 |
| 4,661,465 A * | 4/1987 | Fuentes, Jr. ............. | C08F 10/00 502/115 |
| 5,045,612 A | 9/1991 | Schell, Jr. et al. | |
| 5,114,897 A | 5/1992 | Schell, Jr. et al. | |

(Continued)

FOREIGN PATENT DOCUMENTS

| | | |
|---|---|---|
| CN | 102282182 A | 12/2011 |
| CN | 107107594 A | 8/2017 |

(Continued)

OTHER PUBLICATIONS

Communication pursuant to Rules 161(1) and 162 EPC, dated Jan. 19, 2021, pertaining to European Patent Application No. 19730065.0.

(Continued)

*Primary Examiner* — Rip A Lee
(74) *Attorney, Agent, or Firm* — Dinsmore & Shohl LLP

(57) ABSTRACT

A heterogeneous procatalyst includes a titanium species, a magnesium chloride component, and a chlorinating agent having a structure $A(Cl)x(R^1)3-x$, where A is aluminum or boron, $R^1$ is a ($C_1$-$C_{30}$) hydrocarbyl, and x is 1, 2, or 3. The magnesium chloride component may be thermally treated at a temperature greater than 100 C for at least 30 minutes before or after introduction of the chlorinating agent and titanium species to the heterogeneous procatalyst. The heterogeneous procatalyst having the thermally treated magnesium chloride exhibits improved average molecular weight capability. Processes for producing the heterogeneous procatalyst and processes for producing ethylene-based polymers utilizing the heterogeneous procatalyst are also disclosed.

13 Claims, No Drawings

(56) References Cited

U.S. PATENT DOCUMENTS

| | | | | |
|---|---|---|---|---|
| 7,427,653 | B2* | 9/2008 | Brita | C08F 10/00 |
| | | | | 502/103 |
| 8,138,112 | B2* | 3/2012 | Ribour | C08F 10/00 |
| | | | | 502/118 |
| 9,688,795 | B2 | 6/2017 | Cerk et al. | |
| 10,113,017 | B2* | 10/2018 | Mannebach | C08F 10/02 |
| 11,542,344 | B2* | 1/2023 | Chen | C08F 210/16 |
| 2009/0306316 | A1* | 12/2009 | Morini | C08F 10/02 |
| | | | | 502/171 |
| 2010/0029869 | A1* | 2/2010 | Morini | C08F 110/02 |
| | | | | 526/119 |
| 2014/0080970 | A1 | 3/2014 | Desjardins et al. | |
| 2017/0021599 | A1 | 1/2017 | Pan et al. | |
| 2021/0205786 | A1* | 7/2021 | Chen | C08F 4/022 |
| 2021/0221924 | A1* | 7/2021 | Chen | C08F 10/02 |

FOREIGN PATENT DOCUMENTS

| | | | | |
|---|---|---|---|---|
| EP | 0 696 600 | A2* | 2/1996 | C08F 4/646 |
| WO | WO 2017/115993 | A1* | 10/2007 | C08F 4/65 |
| WO | 2010081676 | A1 | 7/2010 | |
| WO | 2015157939 | A | 10/2015 | |
| WO | 2017040127 | A1 | 3/2017 | |

OTHER PUBLICATIONS

International Preliminary Report on Patentability, dated Dec. 1, 2020, pertaining to International Patent application No. PCT/US2019/033706.

Czaja et al., "Vanadium-based Ziegler-Natta catalyst supported on MgCl2(THF)2 for ethylene polymerization", Macromol. Rapid Commun., 1996, 17, 253-260.

Fregonese et al., "Ziegler-Natta MgCl2-supported catalysts: relationship between titanium oxidation states distribution and activity in olefin polymerization", Journal of Molecular Catalysis A: Chemical, 2001, 172, 89-95.

Mello et al., "Neodymium Ziegler-Natta catalysts: Evaluation of catalyst ageing effect on 1,3-butadiene polymerization", European Polymer Journal, 2008, 44, 2893-2898.

Aigner et al., "Effects of Alterations to Ziegler-Natta Catalysts on Kinetics and Comonomer (1-Butene) Incorporation", Macromolecular Reaction Engineering, 2017.

International Search Report and Written Opinion pertaining to PCT/US2019/033706, dated Aug. 13, 2019.

Chinese Office Action, dated Sep. 9, 2022, pertaining to Patent Application No. 201980039126.0 10 pages.

Chinese Search Report, dated Sep. 9, 2022, pertaining to Patent Application No. 201980039126.0 2 pages.

Communication pursuant to Article 94(3) EPC, dated Dec. 16, 2022, pertaining to Patent Application No. 19730065.0 7 pages.

Second Chinese Office Action, dated Feb. 23, 2023 pertaining to patent application No. 201980039126.0 14 pages.

Chinese Search Report, dated Feb. 23, 2023 pertaining to patent application No. 201980039126.0 pp. 2.

Chinese Final Rejection, dated Jul. 26, 2023 pertaining to patent application No. 201980039126.0 10 pages.

Japanese Office Action, dated May 23, 2023 pertaining to Japanese Patent Application No. 2020-564453 2 pages.

* cited by examiner

ZIEGLER-NATTA CATALYST SYSTEM HAVING A THERMALLY TREATED MAGNESIUM CHLORIDE COMPONENT

CROSS-REFERENCE TO RELATED APPLICATIONS

This application is a National Stage Entry under 35 U.S.C. § 371 of International Patent Application No. PCT/US2019/033706, filed May 23, 2019, which claims the benefit of U.S. Provisional Patent Application Serial No. 62/679,305 filed Jun. 1, 2018, both of which are hereby incorporated by reference herein in their entireties.

TECHNICAL FIELD

Embodiments of the present disclosure generally relate to Ziegler-Natta catalysts useful for olefin polymerizations. More specifically, embodiments of the present disclosure relate to Ziegler-Natta catalysts for producing ethylene-based polymers with increased molecular weight and high density fraction.

BACKGROUND

Polyethylene polymers are some of the most common plastics and may be used in a variety of ways depending on the structure of the polymer, for example, as bags/liners, caps/closures, hygiene films, industrial injection molding, etc. It has been estimated that approximately 80 million metric tons of ethylene-based polymer is produced each year. Because there is a need for significant and continued differentiation of polymer products in the polyethylene markets, researchers have devoted a great deal of effort to searching for process alterations that will yield such new products.

For many polyethylene polymers and copolymers, such as linear low density polyethylene (LLDPE) for example, ethylene is generally copolymerized with a short-chain olefin comonomer (for example, 1-butene, 1-hexene and/or 1-octene). The resulting polyethylene polymer is substantially linear but includes significant numbers of short branches, and these characteristics give it a higher tensile strength, higher impact strength and higher puncture resistance than those of low density polyethylene (LDPE). These improved properties, in turn, mean that films with decreased thickness (gauge) can be blown, and the film exhibits improved environmental stress cracking resistance. LLDPE is used predominantly in film applications due to its toughness, flexibility and relative transparency. Product examples range from agricultural films, food protection wrap, and bubble wrap, to multilayer and composite films.

Ziegler-Natta catalysts have been used for many years in producing a variety of polyethylenes, including LLDPE. These catalysts generally include a magnesium halide support and at least one transition metal compound. Though effective, these catalysts frequently result in LLDPE resins with broad polydispersity and undesirably broad short chain branching distribution (SCBD). Additionally, Ziegler-Natta catalysts are generally limited in their molecular weight capability.

SUMMARY

Accordingly, there is an ongoing need for processes, catalyst compositions, and methods for producing new, differentiated ethylene-based polymers (e.g., LLDPE polymers). In particular, there is an ongoing need for processes, catalyst compositions, and methods for producing ethylene-based polymers with increased weight average molecular weight (Mw), increased high density fraction (HDF), and reduced comonomer weight percent. The present disclosure is directed to heterogeneous procatalysts and catalyst systems and methods and processes utilizing these heterogeneous procatalysts and catalyst systems to produce ethylene-based polymers. In some embodiments, the ethylene-based polymers produced with the heterogeneous procatalysts may have increased Mw and HDF and decreased comonomer weight percent compared to ethylene-based polymers produced using comparative Ziegler-Natta catalysts under the same reaction conditions. In some embodiments, the heterogenous procatalysts may produce ethylene-based polymers with reduced melt index ratio ($I_{10}/I_2$). In still other embodiments, the heterogeneous procatalysts may enable the ethylene-based polymers to have tunable Mw and HDF.

According to at least one embodiment, a heterogeneous procatalyst may include a titanium species and a chlorinating agent having a structure $A(Cl)_x(R^1)_{3-x}$, where A is aluminum or boron, $R^1$ is a ($C_1$-$C_{30}$) hydrocarbyl, and x is 1, 2, or 3. The heterogeneous procatalyst may further include a thermally-treated magnesium chloride component.

According to at least another embodiment, a process for polymerizing ethylene-based polymers includes contacting ethylene and optionally one or more α-olefins in the presence of a catalyst system. The catalyst system may include a heterogeneous procatalyst that includes a titanium species, a thermally-treated magnesium chloride component, and a chlorinating agent having a structure $A(Cl)_x(R^1)_{3-x}$, where A is aluminum or boron, $R^1$ is a ($C_1$-$C_{30}$) hydrocarbyl, and x is 1, 2, or 3.

According to still other embodiments, a process for making a procatalyst may include thermally treating a magnesium chloride slurry at a treatment temperature of at least 100° C. and for at least 30 minutes. The magnesium chloride slurry may include at least magnesium chloride ($MgCl_2$) dispersed in a solvent. The process for making a procatalyst may further include combining a chlorinating agent and a titanium species with the magnesium chloride slurry, the chlorinating agent having a structure $A(Cl)_x(R^1)_{3-x}$, where A is aluminum or boron, $R^1$ is ($C_1$-$C_{30}$)hydrocarbyl, and x is 1, 2, or 3.

Additional features and advantages will be set forth in the detailed description which follows, and in part will be readily apparent to those skilled in the art from that description or recognized by practicing the embodiments described herein, including the detailed description which follows and the claims. It is to be understood that both the foregoing general description and the following detailed description describe various embodiments and are intended to provide an overview or framework for understanding the nature and character of the claimed subject matter.

DETAILED DESCRIPTION

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers.

"Ethylene-based polymer" shall mean polymers comprising greater than 50% by weight of units which have been derived from ethylene monomer. This includes polyethylene homopolymers or copolymers (meaning units derived from two or more comonomers). Common forms of ethylene-based polymer known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

As used herein, the "solution polymerization reactor" is a vessel, which performs solution polymerization, wherein ethylene monomer, optionally with a comonomer, polymerizes or copolymerizes after being dissolved in a non-reactive solvent that contains a catalyst. Heat may be removed or added to the solution polymerization reactors and after typically by coupling the reactor to one or more heat exchangers. In the solution polymerization process, hydrogen may be utilized; however, it is not required in all solution polymerization processes.

Ziegler-Natta catalysts are commonly used to produce ethylene-based polymers in copolymerization processes for copolymerizing ethylene and one or more alpha-olefin comonomers. In these copolymerization processes using typical Ziegler-Natta catalysts, polymer average molecular weight decreases rapidly as polymerization temperature increases. However, high polymerization temperatures in solution polymerization processes increase production throughput and produce ethylene-based polymers with desired polymer properties, such as superior optics and dart/tear balance. Increasing the molecular weight capability of a Ziegler-Natta catalyst may expand its ability to make new products and make it possible to operate at higher polymerization temperatures.

The present disclosure is directed to a Ziegler-Natta-type heterogeneous procatalyst and catalyst system that exhibit increased molecular weight capabilities compared to existing Ziegler-Natta catalysts. The catalyst system disclosed herein includes a heterogeneous procatalyst and a cocatalyst. The heterogeneous procatalyst includes a titanium species, a thermally-treated magnesium chloride component, and a chlorinating agent. In embodiments, the thermally treated magnesium chloride component may be a product of thermally treating a magnesium chloride slurry at a temperature of at least 100° C. for at least 30 minutes, the magnesium chloride slurry comprising at least magnesium chloride dispersed in a solvent, as will be described subsequently in greater detail. The thermal treatment may change the morphology of the magnesium chloride. The magnesium chloride may be thermally treated before or after addition of the chlorinating agent and titanium compound to the magnesium chloride. The changes in the morphology of the magnesium chloride may increase the molecular weight capability of the heterogeneous procatalyst. A polymerization process is also disclosed that includes contacting ethylene and optionally one or more α-olefin comonomers with a catalyst system that includes the heterogeneous procatalyst disclosed herein and optionally a cocatalyst to form an ethylene-based polymer. The ethylene-based polymers produced using the heterogeneous procatalysts with the thermally treated magnesium chloride, as disclosed herein, may exhibit greater weight average molecular weight (Mw), greater high density fraction (HDF), and lesser content of the optional comonomer compared to comparable polymers made with comparative Ziegler-Natta catalysts, for which the magnesium chloride has not been thermally treated.

Preparation of the heterogeneous procatalyst may include preparing the magnesium chloride ($MgCl_2$). In some embodiments, preparing the $MgCl_2$ may include reacting an organomagnesium compound, or a complex including an organomagnesium compound, with a chloride compound, such as a metallic or non-metallic chloride, to form a reaction product, then thermally treating the reaction product to form a thermally-treated magnesium chloride ($MgCl_2$) component. Examples of organomagnesium compounds and/or complexes may include, but are not limited to, magnesium $C_2$-$C_8$ alkyls and aryls, magnesium alkoxides and aryloxides, carboxylated magnesium alkoxides, and carboxylated magnesium aryloxides, or combinations of these. In some embodiments, the organomagnesium compound may include a magnesium $C_2$-$C_8$ alkyl, a magnesium $C_1$-$C_8$ alkoxide, or combinations of these. In some embodiments, the organomagnesium compound may be butyl ethyl magnesium.

The organomagnesium compound or complex may be soluble in a hydrocarbon diluent, such as an inert hydrocarbon diluent. Examples of hydrocarbon diluents may include, but are not limited to, liquefied ethane, propane, isobutane, n-butane, n-hexane, individual hexane isomers or mixtures thereof, isooctane, paraffinic mixtures of alkanes having from 5 to 20 carbon atoms, cyclohexane, methylcyclopentane, dimethylcyclohexane, dodecane, industrial solvents composed of saturated or aromatic hydrocarbons such as kerosene and/or naphthas, and combinations thereof. In some embodiments, the hydrocarbon diluent may be substantially free of any olefinic compounds and other impurities. As used herein, the term "substantially free" of a constituent means that a composition includes less than 0.1 wt. % of the constituent (e.g., impurity, compound, element, etc.). In some embodiments, the hydrocarbon diluent may have a boiling point in the range from about −50° C. to about 200° C. In some embodiments, the hydrocarbon diluent may include an isoparaffinic solvent. Examples of ispoaraffinic solvents may include, but are not limited to, ISOPAR™ synthetic paraffin solvents available from ExxonMobile (e.g., ISOPAR™ E paraffinic solvent) and special boiling point (SBP) solvents available from Shell Chemicals (e.g., SBP 100/140 high purity de-aromatised hydrocarbon solvent). Other examples of hydrocarbon diluents may include ethylbenzene, cumene, decalin, and combinations thereof.

In some embodiments, the process of preparing the $MgCl_2$ may include dispersing the organomagnesium compound in the hydrocarbon diluent to form a solution or a slurry. The concentration of the organomagnesium compound in the hydrocarbon diluent may be sufficient to provide for efficient production of the magnesium chloride without using an excessive amount of solvent. The concentration of the organomagnesium compound should not be so great that the solution or slurry cannot be properly mixed/agitated or fluidly transported during and after synthesis. The solution or slurry of the organomagnesium compound dispersed in the hydrocarbon diluent may be contacted with the chloride compound to produce the $MgCl_2$. The chloride compound may be a metallic or non-metallic chloride. For example, in some embodiments, the chloride compound may be hydrochloride gas. In some embodiments, the solution or slurry of organomagnesium compound and chloride compound may be contacted at a temperature of from −25° C. to 100° C., or from 0° C. to 50° C. In some embodiments, the solution or slurry of organomagnesium compound and metallic or non-metallic chloride may be contacted for a time of from 1 hour to 12 hours, or from 4 hours to 6 hours.

The reaction of the chloride compound with the organomagesium compound may produce an untreated $MgCl_2$. The untreated $MgCl_2$ may be in the form of a $MgCl_2$ slurry that includes a plurality of $MgCl_2$ particles dispersed in the hydrocarbon diluent. In some embodiments, the untreated $MgCl_2$ slurry may consist of or consist essentially of the plurality of $MgCl_2$ particles dispersed in the hydrocarbon diluent. In some embodiments, the $MgCl_2$ slurry may have a concentration of $MgCl_2$ of from 0.05 mol/L to 10.0 mol/L, from 0.1 to 5.0 mol/L, or about 0.2 mol/L.

The untreated $MgCl_2$ slurry may be further processed by thermally treating the untreated $MgCl_2$ slurry at a temperature of at least 100° C. and for a time of at least 30 minutes to produce a thermally-treated $MgCl_2$ component dispersed in the hydrocarbon diluent. The thermal treatment of the $MgCl_2$ slurry may be conducted before or after addition of the chlorinating agent and titanium species to the $MgCl_2$ slurry. For example, in some embodiments, the $MgCl_2$ slurry including the $MgCl_2$ particles dispersed in the hydrocarbon diluent may be thermally treated at a temperature of greater than or equal to 100° C., greater than or equal to 120° C., greater than or equal to 130° C., greater than or equal to 150° C., or even greater than or equal to 190° C. before addition of the chlorinating agent and titanium species. In some embodiments, the $MgCl_2$ slurry may be thermally treated at a temperature of from 100° C. to 500° C., from 100° C. to 300° C., from 100° C. to 200° C., from 120° C. to 500° C., from 120° C. to 300° C., from 120° C. to 200° C., from 130° C. to 500° C., from 130° C. to 300° C., from 130° C. to 200° C., from 150° C. to 500° C., from 150° C. to 300° C., from 150° C. to 200° C., from 190° C. to 500° C., or from 190° C. to 300° C. In some embodiments, the $MgCl_2$ slurry may be thermally treated at two or more different temperatures during the thermal treatment.

The $MgCl_2$ slurry may be thermally treated for a time greater than or equal to 30 minutes (0.5 hours), greater than or equal to 1 hour, greater than or equal to 2 hours, greater than or equal to 3 hours, greater than or equal to 6 hours, or greater than or equal to 10 hours to produce the thermally treated $MgCl_2$ component. For example, in some embodiments, the $MgCl_2$ slurry may be thermally treated for a time of from 0.5 hours to 240 hours, from 0.5 hours to 120 hours, from 0.5 hours to 48 hours, from 0.5 hours to 24 hours, from 1 hour to 240 hours, from 1 hour to 120 hours, from 1 hour to 48 hours, from 1 hour to 24 hours, from 2 hours to 240 hours, from 2 hours to 120 hours, from 2 hours to 48 hours, from 2 hours to 24 hours, from 3 hours to 240 hours, from 3 hours to 120 hours, from 3 hours to 48 hours, from 3 hours to 24 hours, from 6 hours to 240 hours, from 6 hours to 120 hours, from 6 hours to 48 hours, from 6 hours to 24 hours, from 10 hours to 240 hours, from 10 hours to 120 hours, from 10 hours to 48 hours, or from 10 hours to 24 hours to produce the thermally treated $MgCl_2$ component.

In some embodiments, thermally treating the $MgCl_2$ slurry may include agitating the $MgCl_2$ slurry. Agitating the $MgCl_2$ slurry may be performed simultaneously with thermally treating the $MgCl_2$ slurry at a temperature of at least 100° C. and for at least 30 minutes. In some embodiments, the $MgCl_2$ slurry may be agitated at a speed of up to 1000 rotations per minute (rpm), up to 100 rpm, from 1 rpm to 1000 rpm, or from 1 rpm to 100 rpm. In some embodiments, thermally treating the $MgCl_2$ may include thermally treating the $MgCl_2$ in an inert atmosphere. Inert atmosphere refers to an atmosphere that consists essentially of compounds and/or gases that do not react with the $MgCl_2$ or any other constituent of the heterogeneous procatalyst. For example, thermally treating the $MgCl_2$ may be conducted in the presence of an inert gas, such as nitrogen or argon for example, that does not react with the $MgCl_2$.

In some embodiments, thermally treating the $MgCl_2$ may include thermally treating a $MgCl_2$ slurry consisting of $MgCl_2$ particles dispersed in the hydrocarbon diluent at a temperatures of at least 100° C. and for at least 30 minutes. The phrases "consisting of" and "consists of" are used as closed transitional phrases limiting a composition or method to the recited components or method steps and any naturally occurring impurities. In other embodiments, thermally treating the $MgCl_2$ may include thermally treating a $MgCl_2$ slurry consisting essentially of $MgCl_2$ particles dispersed in the hydrocarbon diluent at a temperature of at least 100° C. and for at least 30 minutes. The phrases "consisting essentially of" and "consists essentially of" are intended to be partially closed transitional phrases that limit a composition or method to the recited constituents or method steps as well as any non-recited constituents or method steps that do not materially affect the novel characteristics of the claimed subject matter.

In some embodiments, the thermally-treated $MgCl_2$ component may be a product of thermally treating a $MgCl_2$ slurry prepared as previously described. The thermally-treated $MgCl_2$ component may include $MgCl_2$ particles dispersed in the hydrocarbon diluent and having morphologies altered from the thermal treatment. Not intending to be bound by theory, it is believed that thermally treating the $MgCl_2$ component may modify the surface morphology and surface area of the $MgCl_2$ particles. The resultant change in surface morphology of the thermally treated $MgCl_2$ may modify the activity of the heterogeneous procatalyst for polymerizing olefins and change the polymerization behaviors of the heterogeneous procatalyst as well as the molecular weight of the resultant polymer. In some embodiments, following thermal treatment, the thermally treated $MgCl_2$ may have an average surface area of from 50 meters squared per gram ($m^2/g$) to 1000 $m^2/g$, from 100 $m^2/g$ to 1000 $m^2/g$, from 200 $m^2/g$ to 1000 $m^2/g$, or from 400 $m^2/g$ to 1000 $m^2/g$. In some embodiments, the thermally treated $MgCl_2$ may have an average surface area of from 150 $m^2/g$ to 400 $m^2/g$, or about 200 $m^2/g$.

Preparing the heterogeneous protcatalyst may further include contacting the thermally-treated $MgCl_2$ component with a chlorinating agent. The chlorinating agent may have a structural formula $A(Cl)_x(R^1)_{3-x}$, where A is an element selected from the group consisting of boron, aluminum, gallium, indium, silicon, and tellurium, $R^1$ is a ($C_1$-$C_{30}$) hydrocarbyl, and x is 1, 2, or 3. In some embodiments, A may be aluminum or boron. In some embodiments, the chlorinating agent may be chosen from aluminum trichloride, methylaluminum dichloride, dimethylaluminum chloride, ethylaluminum dichloride, diethylaluminum chloride, ethylaluminum sesquichloride, isobutylaluminum dichloride, diisobutylaluminum chloride, hexylaluminum dichloride, di-n-hexylaluminum chloride, n-octylaluminum dichloride, di-n-octylalumnium chloride, boron trichloride, phenylboron dichloride, dicyclohexylboron chloride, silicon tetrachloride, methyltrichlorosilane, dimethylchlorosilane, chlorotrimethylsilane, ethyltrichlorosilane, dichlorodiethylsilane, chlorotriethylsilane, n-propyltrichlorosilane, dichlorodi(n-propyl)silane, chlorotri(n-propyl)silane, isopropyltrichlorosilane, dichloro-diisopropylsilane, chlorotriisopropylsilane, n-butyltrichlorosilane, dichlorodi(n-butyl)silane, chlorotri(n-butyl)silane, isobutyl-trichlorosilane, dichlorodiisobutylsilane, chlorotriisobutyl-silane, cyclopentyltrichlorosilane, dichlorodicyclopentylsilane, n-hexyltrichlorosilane, cyclohexyltrichlorosilane, dichlorodicyclohexylsilane, or combinations of these.

The thermally-treated $MgCl_2$ component may be contacted with the chlorinating agent under conditions sufficient to condition the thermally-treated $MgCl_2$ component. The thermally-treated $MgCl_2$ component may be contacted with the chlorinating agent at a temperature of from 0° C. to 50° C., from 0° C. to 35° C., from 25° C. to 50° C., or from 25° C. to 35° C. The thermally-treated $MgCl_2$ component may be contacted with the chlorinating agent for a time of from 1 hour to 144 hours, from 1 hour to 72 hours, from 1 hour to 24 hours, from 1 hour to 12 hours, from 4 hours to 144 hours, from 4 hours to 72 hours, from 4 hours to 24 hours, from 4 hours to 12 hours, from 6 hours to 144 hours, from 6 hours to 72 hours, from 6 hours to 24 hours, or from 6 hours to 12 hours. Not intending to be bound by any theory, it is believed that conditioning the thermally-treated $MgCl_2$ component by contacting the thermally-treated $MgCl_2$ component with the chlorinating agent may facilitate or enhance adsorption of additional metals, such as the titanium species for example, onto the thermally-treated $MgCl_2$ component. In some embodiments, the a molar ratio of the chlorinating agent to the thermally-treated $MgCl_2$ component in the heterogeneous procatalyst may be from 3:40 to 14:40, from 3:40 to 12:40, from 6:40 to 14:40, or from 6:40 to 12:40.

The thermally-treated $MgCl_2$ component conditioned by the chlorinating agent may then be contacted with a titanium species to produce the heterogeneous procatalyst. The titanium species may be any titanium compound or titanium complex having catalytic activity after being incorporated in the procatalyst upon activation with a cocatalyst. For example, in some embodiments, the titanium species may include a titanium halide, a titanium alkoxide, or combinations thereof. In some embodiments, titanium species is $TiCl_{4-c}(OR)_c$ or $TiCl_{3-d}(OR)_d$, wherein R is $(C_1-C_{20})$hydrocarbyl, c is 0, 1, 2, 3, or 4, and d is 0, 1, 2, or 3. For example, in some embodiments, the titanium species may include, but is not limited to, titanium (IV) tetrachloride, titanium (III) trichloride, diethoxytitanium(IV) dichloride, diisopropoxytitanium(IV) dichloride, di-n-butoxytitanium(IV) dichloride, diisobutoxytitanium(IV) dichloride, triisopropoxytitanium(IV) chloride, tri-n-butoxytitanium(IV) chloride, triisobutoxytitanium(IV) chloride, titanium(IV) tetraisopropoxide ($Ti(O^iPr)_4$), titanium(IV) ethoxide, titanium(IV) n-butoxide, titanium(IV) isobutoxide, titanium(IV) 2-ethylhexoxide, dichlorobis(2,2,6,6-tetramethyl-3,5-heptanedionato)titanium(IV), tris(2,2,6,6-tetramethyl-3,5-heptanedionato)titanium(III), tetrachlorobis(tetrahydrofuran)titanium(IV), trichlorotris(tetrahydrofuran)titanium(III), methyltitanium (IV) trichloride, or combinations of these. In some embodiments, the titanium species may be titanium (IV) tetrachloride or titanium(IV) tetraisopropoxide ($Ti(O^iPr)_4$).

The thermally-treated $MgCl_2$ component conditioned by the chlorinating agent may be contacted with the titanium species under conditions sufficient to adsorb at least a portion of the titanium species onto the $MgCl_2$ component. For example, in some embodiments, the thermally-treated $MgCl_2$ component may be contacted with the titanium species at a temperature of from 0° C. to 50° C., from 0° C. to 35° C., from 25° C. to 50° C., or from 25° C. to 35° C. In some embodiments, the thermally-treated $MgCl_2$ component may be contacted with the titanium species for a time of from 0.5 hour to 72 hours, from 0.5 hour to 24 hours, from 0.5 hour to 12 hours, from 0.5 hour to 6 hours, from 3 hours to 72 hours, from 3 hours to 24 hours, from 3 hours to 12 hours, from 6 hours to 72 hours, from 6 hours to 24 hours, or from 6 hours to 12 hours. In some embodiments, the heterogeneous procatalyst may include a molar ratio of the titanium species to the thermally-treated $MgCl_2$ component in the heterogeneous procatalyst of from 0.5:40 to 5:40, from 0.5:40 to 3:40, from 1.5:40 to 5:40, or from 1.5:40 to 3:40.

As previously described, in some embodiments, the untreated $MgCl_2$ slurry may be thermally treated after addition of the chlorinating agent and the titanium species to the $MgCl_2$ slurry to produce the thermally-treated $MgCl_2$ component. For example, in some embodiments, preparing the heterogeneous procatalyst may include preparing the untreated $MgCl_2$ slurry, contacting the untreated $MgCl_2$ slurry with the chlorinating agent to produce an untreated $MgCl_2$ slurry conditioned by the chlorinating agent, contacting the untreated $MgCl_2$ slurry conditioned by the chlorinating agent with the titanium species to produce a pretreated heterogeneous procatalyst, and thermally treating the pretreated heterogeneous procatalyst to produce the heterogeneous procatalyst comprising the thermally treated $MgCl_2$ component, chlorinating agent, and titanium species. The pretreated heterogeneous procatalyst refers to the mixture of the titanium species and the untreated $MgCl_2$ slurry conditioned by the chlorinating agent. The pretreated heterogeneous procatalyst may then be thermally treated at a temperature of at least 100° C. and for a time of at least 30 minutes to produce the heterogeneous procatalyst having the thermally treated $MgCl_2$ component. In some embodiments, the pretreated heterogeneous procatalyst may be thermally treated at a temperature of greater than or equal to 100° C., greater than or equal to 120° C., greater than or equal to 130° C., greater than or equal to 150° C., or even greater than or equal to 190° C. In some embodiments, the pretreated heterogeneous procatalyst may be thermally treated at a temperature of from 100° C. to 500° C., from 100° C. to 300° C., from 100° C. to 200° C., from 120° C. to 500° C., from 120° C. to 300° C., from 120° C. to 200° C., from 130° C. to 500° C., from 130° C. to 300° C., from 130° C. to 200° C., from 150° C. to 500° C., from 150° C. to 300° C., from 150° C. to 200° C., from 190° C. to 500° C., or from 190° C. to 300° C.

The pretreated heterogeneous procatalyst may be thermally treated for a time greater than or equal to 30 minutes (0.5 hours), greater than or equal to 1 hour, greater than or equal to 2 hours, greater than or equal to 3 hours, greater than or equal to 6 hours, or greater than or equal to 10 hours to produce the heterogeneous procatalyst having the thermally treated $MgCl_2$ component. For example, in some embodiments, the pretreated heterogeneous procatalyst may be thermally treated for a time of from 0.5 hours to 240 hours, from 0.5 hours to 120 hours, from 0.5 hours to 48 hours, from 0.5 hours to 24 hours, from 1 hour to 240 hours, from 1 hour to 120 hours, from 1 hour to 48 hours, from 1 hour to 24 hours, from 2 hours to 240 hours, from 2 hours to 120 hours, from 2 hours to 48 hours, from 2 hours to 24 hours, from 3 hours to 240 hours, from 3 hours to 120 hours, from 3 hours to 48 hours, from 3 hours to 24 hours, from 6 hours to 240 hours, from 6 hours to 120 hours, from 6 hours to 48 hours, from 6 hours to 24 hours, from 10 hours to 240 hours, from 10 hours to 120 hours, from 10 hours to 48 hours, or from 10 hours to 24 hours. In some embodiments, thermally treating the pretreated heterogeneous procatalyst after addition of the chlorinating agent and titanium species to the $MgCl_2$ slurry may include agitating the pretreated heterogeneous procatalyst during the thermal treatment, as previously described. In some embodiments, thermally treating the pretreated heterogeneous procatalyst may be conducted in an inert atmosphere to produce the heterogeneous procatalyst that includes the thermally-treated $MgCl_2$ component, the chlorinating agent, and the titanium species.

In some embodiments, the heterogeneous procatalyst may include a vanadium compound. Incorporation of a vanadium compound into the heterogeneous procatalyst may enable the heterogeneous procatalyst to produce an ethylene-based polymer having narrowed molecular weight distribution (MWD), which may be reflected in a reduced polydispersity index (PDI) and a reduced melt flow ratio $I_{10}/I_2$ of less than or equal to 7, or even less than or equal to 6.5 compared to a polymer produced using a comparative catalyst without the vanadium compound under the same reaction conditions. Including the vanadium species into the heterogeneous procatalyst may also enable the high density fraction of the ethylene-based polymers produced by the heterogeneous procatalysts to be tuned by modifying the type and/or amount of the vanadium species.

The vanadium species may be a vanadium species having catalytic activity. For example, in some embodiments, the vanadium species may include, but may not be limited to, a vanadium halide, a vanadium oxohalide, a vanadium oxoalkoxide, or combinations thereof. For example, in some embodiments, the vanadium species may be chosen from $VX_4$, $VOX_3$, or $VO(OR^2)_3$, where each X is independently a halogen atom or ($C_1$-$C_{40}$ heterohydrocarbyl) and $R^2$ is ($C_1$-$C_{20}$)hydrocarbyl or —C(O)$R^3$ in which $R^3$ is ($C_1$-$C_{30}$) hydrocarbyl. In one or more embodiments, $R^2$ and $R^3$ may be chosen from methyl, ethyl, propyl, 2-propyl, n-butyl, tert-butyl, iso-butyl, pentyl, hexyl, heptyl, n-octyl, tert-octyl, nonyl, or decyl. In some embodiments, when $R^2$ is —C(O) $R^3$, $R^3$ is 3-heptyl. In some embodiments, the vanadium species may may be chosen from vanadium(IV) chloride, vanadium(V) oxytrichloride ($VOCl_3$), vanadium(V) oxytrimethoxide, vanadium(V) oxytriethoxide, vanadium(V) oxytriisopropoxide, vanadium(V) oxytributoxide, vanadium (V) oxytriisobutoxide, vanadium(V) oxypropoxide (VO (O"Pr)$_3$), vanadyl acetate, vanadium(IV) oxide stearate, vanadium octanoate, and combinations of these. In some embodiments, the vanadium species may be added to the heterogeneous procatalyst. In some embodiments, the vanadium species may be added to the pretreated heterogeneous procatalyst or to the $MgCl_2$ slurry conditioned by the chlorinating agent. In some embodiments, the heterogeneous procatalyst may have a molar ratio of the vanadium species to the $MgCl_2$ in the heterogeneous procatalyst of from 0.1:40 to 8:40, from 0.1:40 to 4:40, from 0.2:40 to 5:40, or from 0.2:40 to 4:40.

The heterogeneous procatalyst prepared by any of the previously described processes may be combined with a cocatalyst to produce the catalyst system. The cocatalyst may include at least one organometallic compound such as an alkyl or haloalkyl of aluminum, aluminoxane, alkylaluminum alkoxide, an alkylaluminum halide, a Grignard reagent, an alkali metal aluminum hydride, a metal alkyl, an alkali metal borohydride, an alkali metal hydride, an alkaline earth metal hydride, or the like. In some embodiments, the cocatalyst may be an organoaluminum compound. In some embodiments, the cocatalyst may be chosen from an alkyl of aluminum, a haloalkyl of aluminum, an alkylaluminum halide, and mixtures thereof. In some embodiments, the cocatalyst may be chosen from triethylalumnium, trimethylalumnium, tri-n-butylalumnium, triisobutylalumnium, tri-n-hexylalumnium, tri-n-octylalumnium, diethylalumnium chloride, methylaluminoxane (MAO), modified methylaluminoxane (MMAO), diethylaluminum ethoxide, and mixtures thereof. As previously discussed, the catalyst system may include the heterogeneous procatalyst and the cocatalyst. Preparing the catalyst system may include contacting the heterogeneous procatalyst with the cocatalyst.

The formation of the catalyst system from reaction of the heterogeneous procatalyst and the cocatalyst may be carried out in situ (e.g., in place in the reactor), just prior to entering the polymerization reactor, or before polymerization. Thus, the combination of the heterogeneous procatalyst and the cocatalyst may occur under a wide variety of conditions. Such conditions may include, for example, contacting the heterogeneous procatalyst and cocatalyst under an inert atmosphere such as nitrogen, argon or other inert gas at temperatures of from 0° C. to 250° C., from 0° C. to 200° C., from 15° C. to 250° C., from 15° to 200° C., from 15° C. to 50° C., or from 150° C. to 250° C. In the preparation of the catalytic reaction product (i.e., catalyst system), it is not necessary to separate hydrocarbon soluble components from hydrocarbon insoluble components. Time for contact between the heterogeneous procatalyst and the cocatalyst prior to the polymerization reaction may be from greater than 0 minutes to 10 days, from greater than 0 minutes to 60 minutes, from greater than 0 minutes to 5 minutes, from 0.1 minutes to 5 minutes, from 0.1 minutes to 2 minutes, or from 1 minute to 24 hours. Various combinations of these conditions may be employed. In some embodiments, the catalyst system may have a molar ratio of the cocatalyst to the titanium species in the heterogeneous procatalyst of from 0.5:1 to 50:1, 3:1 to 20:1, from 3:1 to 15:1, from 3:1 to 10:1, from 3:1 to 8:1, from 5:1 to 20:1, from 5:1 to 15:1, from 5:1 to 10:1, from 8:1 to 20:1, or from 8:1 to 15:1.

The catalyst system including the heterogeneous procatalyst and cocatalyst may be used in a polymerization or copolymerization process for polymerizing olefins. For example, in some embodiments, the catalyst system may be utilized in a polymerization or copolymerization process to make ethylene-based polymers, such as linear low density polyethylene (LLDPE) and/or other ethylene-based polymers. In some embodiments, the polymerization or copolymerization process may include contacting ethylene and optionally one or more α-olefin comonomers with the catalyst system comprising the heterogeneous procatalyst and optionally a cocatalyst to form an ethylene-based polymer. The olefin polymerization/copolymerization reaction may be conducted in a reaction medium. The reaction medium may be a hydrocarbon diluent, such as an isoparaffinic solvent, an aliphatic hydrocarbon, or any of the other hydrocarbon diluents previously described in this disclosure. The olefin polymerization/copolymerization process may include contacting the olefin or a combination of olefins with the reaction medium in the presence of the catalyst system, which includes the heterogeneous procatalyst and the cocatalyst. Conditions may be any that are suitable to initiate and maintain a polymerization reaction. In some embodiments, a molecular weight regulator, such as hydrogen for example, may also be present in the reaction vessel to suppress formation of polymer molecules with undesirably high molecular weight.

Any ethylene polymerization or copolymerization reaction system may be employed to produce the ethylene-based polymers using the catalyst systems disclosed herein. Such reaction systems may include, but are not limited to, slurry phase polymerization processes, solution phase polymerization processes, gas-phase polymerization processes, and combinations thereof. The polymerization or copolymerization processes may be performed using one or more conventional reactors, examples of which may include, but are not limited to, loop reactors, stirred tank reactors, fluidizedbed reactors, batch reactors in parallel or in series, and/or any combinations thereof. In some embodiments, the polymerization process may be performed in two or more reactors in series, parallel, or combinations thereof. In other embodiments, the polymerization process may be conducted in a single reactor. The polymerization process may be a batch polymerization process or a continuous polymerization process. For example, in some embodiments, the polymerization process may be a batch polymerization process, which may be conducted in a stirred tank reactor. In some embodiments, the polymerization process may be continuous, such as a polymerization reaction conducted in a continuous solution polymerization reactor. In other embodiments, the polymerization process may include two or more polymerization steps. In these embodiments, the catalyst system including the heterogeneous procatalyst disclosed herein may be used for any one or a plurality of the polymerization steps.

The polymers produced from polymerization/copolymerization processes utilizing the heterogeneous procatalyst disclosed herein may be homopolymers of $C_2$-$C_{20}$ alpha-olefins, such as ethylene, propylene, or 4-methyl-1-pentene. In some embodiments, the polymers from polymerization processes using the heterogeneous procatalyst disclosed herein may include copolymers of ethylene or propylene with at least one or more alpha-olefins comonomers. In some embodiments, the polymers may be ethylene-based polymers, such as copolymers of ethylene with at least one of the above $C_3$-$C_{20}$ alpha-olefins, diolefins. In some embodiments, the comonomer may be an α-olefin comonomer having no more than 20 carbon atoms. For example, in some embodiments, the α-olefin comonomer may have from 3 to 20 carbon atoms, from 3 to 10 carbon atoms, or from 3 to 8 carbon atoms. Exemplary α-olefin comonomers may include, but are not limited to, propylene, 1-butene, 1-pentene, 1-hexene, 1-heptene, 1-octene, 1-nonene, 1-decene, 4-methyl-1-pentene, or combinations of these. In some embodiments, the ethylene-based polymers may include an α-olefin comonomer selected from the group consisting of 1-butene, 1-hexene, and 1-octene. In some embodiments, the ethylene-based polymers produced using the catalyst systems disclosed herein may be copolymers of ethylene monomer units and comonomer units chosen from 1-butene, 1-hexene, 1-octene, or combinations of these.

In the polymerization/copolymerization process utilizing the catalyst system disclosed herein, polymerization is effected by adding a catalytic amount of the catalyst system including the heterogeneous procatalyst to a polymerization reactor containing the selected α-olefin monomers (e.g., ethylene and/or one or more than one α-olefin comonomers), or vice versa. The polymerization reactor may be maintained at a temperature of from 50° C. to 300° C. For example, in some embodiments, the polymerization reactor may be maintained at temperatures of from 50° C. to 230° C., from 50° C. to 200° C., from 100° C. to 300° C., from 100° C. to 230° C., from 100° C. to 200° C., or from 60° C. to 120° C. In some non-limiting embodiments, the reactants, catalyst system, or both may have a residence time in the polymerization reactor of from 5 minutes to 4 hours, from 5 minutes to 20 minutes, or from 0.5 hours to 4 hours. Longer or shorter residence times may alternatively be employed. It is generally desirable to carry out the polymerization in the absence of moisture and oxygen and in the presence of the catalyst system. The amount of the catalyst system may be sufficient to provide a desired productivity (e.g., yield) of the ethylene-based polymers but not so great that amount of the catalyst system is cost prohibitive. It is understood, however, that the most advantageous catalyst concentration will depend upon polymerization conditions such as temperature, pressure, solvent, and the presence of catalyst poisons.

In some embodiments, the polymerization/copolymerization process may be conducted at pressures that are relatively low, such as pressures of from 150 to 3,000 psig (1.0 to 20.7 MPa), from 250 to 1,000 psig (1.7 to 6.9 MPa), or from 450 to 800 psig (3.1 to 5.5 MPa). However, polymerization/copolymerization using the catalyst system described herein may be conducted at pressures from atmospheric pressure to pressures determined by the capabilities (e.g., pressure rating) of the polymerization equipment.

In some embodiments, the polymerization/copolymerization process may include a carrier, which may be an inert organic diluent, excess monomer, or both. Oversaturation of the carrier with the polymer may be generally avoided during the polymerization/copolymerization process. If such saturation of the carrier with the polymer occurs before the catalyst system becomes depleted, the full efficiency of the catalyst system may not be realized. In some embodiments, the polymerization/copolymerization process may be operated at conditions sufficient to maintain the amount of polymer in the carrier/diluent at a concentration less than an oversaturation concentration of the polymer. For example in some embodiments, the polymerization/copolymerization process may be operated under conditions sufficient to maintain the amount of the polymer in the carrier/diluent less than 30 weight percent (wt. %), based on the total weight of the reaction mixture. In some embodiments, the polymerization/copolymerization process may include mixing or stirring the reaction mixture to maintain temperature control and enhance the uniformity of the polymerization reaction throughout the polymerization zone. In some embodiments, such as with more rapid reactions with relatively active catalysts, the polymerization/copolymerization process may include refluxing monomer and diluent, if diluent is included, thereby removing at least some of the heat of reaction. In some embodiments, heat transfer equipment (e.g., heat exchangers, cooling jackets, or other heat transfer means) may be provided for removing at least a portion of the exothermic heat of polymerization.

In some embodiments, the reaction mixture added to the polymerization/copolymerization process may include an amount of ethylene monomer sufficient to maintain reactor stability and increase catalyst efficiency. In some embodiments, the reaction mixture may have a molar ratio of diluent to ethylene monomer of from 1:2 to 1:8, from 1:2 to 1:5, from 1:3 to 1:8, or from 1:3 to 1:5. In some embodiments, a portion of excess ethylene monomer may be vented from the polymerization process to maintain the concentration of ethylene monomer in the reactor.

In some embodiments, the polymerization/copolymerization process may include contacting hydrogen gas with the reaction mixture during the reaction. The hydrogen gas may be operable to reduce molecular weight of the ethylene-based polymer as well as to reduce formation of ultra-high molecular weight molecules of the ethylene-based polymer. In some embodiments in which hydrogen gas is introduced, a concentration of the hydrogen gas in the reaction mixture may be maintained at from 0.001 mole to 1 mole of hydrogen per mole of monomer, where the monomer includes the ethylene monomer and any optional α-olefin comonomers. The hydrogen may be added to the polymerization reactor with a monomer stream, as a separate hydrogen feed stream, or both. The hydrogen may be added to the polymerization reactor before, during, and/or after addition of the monomer to the polymerization reactor. In some embodiments, the hydrogen may be added either before or during addition of the catalyst system. In some embodiments, the polymerization/copolymerization process may be conducted without introducing hydrogen gas.

The resulting ethylene-based polymer may be recovered from the polymerization mixture by driving off unreacted monomer, comonomer, diluent, or both. In some embodiments, no further removal of impurities may be required. The resultant ethylene-based polymer may contain small amounts of catalyst residue. The resulting ethylene-based polymer may further be melt screened. For example, the ethylene-based polymer may be melted with an extruder and then passed through one or more active screens, positioned in series of more than one, with each active screen having a micron retention size of from 2 m to about 400 m. During melt screening, the mass flux of the ethylene-based polymer may be from 5 lb/hr/in$^2$ to about 100 lb/hr/in$^2$.

The increased molecular weight capability of the heterogeneous procatalysts and catalyst systems disclosed herein may enable the polymerization/copolymerization processes to be conducted at greater process temperatures, which may enable the polymerization/copolymerization processes to produce ethylene-based polymers at greater production throughput rates and having improved properties, such as optical properties and/or dart impact/tear balance (i.e., balance between the dart impact performance and the tear performance of the ethylene-based polymer), compared to polymers made at lesser process temperatures. Additionally, the catalyst systems disclosed herein can be used together with molecular catalyst systems for production of bimodal polymers, where the catalyst systems disclosed herein generate a polymer component with high molecular weight and low comonomer content.

The ethylene-based polymers may include less than 50 percent by weight of units derived from one or more α-olefin comonomers. All individual values and subranges from less than 50 wt. % are included herein and disclosed herein. For example, in some embodiments, the ethylene-based polymers may include less than or equal to 30 wt. %, less than or equal to 20 wt. %, less than or equal to 15 wt. %, less than or equal to 10 wt. %, less than or equal to 8 wt. %, less than or equal to 5 wt. %, or less than or equal to 3 wt. % units derived from one or more α-olefin comonomers. The ethylene-based polymers may include at least 50 percent by weight (wt. %) units derived from ethylene. All individual values and subranges from at least 50 wt. % to 100 wt. % are included herein and disclosed herein. For example, in some embodiments, the ethylene-based polymers may comprise from 70 wt. % to 100 wt. %, from 80 wt. % to 100 wt. %, from 85 wt. % to 100 wt. %, from 90 wt. % to 100 wt. %, from 95 wt. % to 100 wt. %, or even from 97 wt. % to 100 wt. % units derived from ethylene.

The ethylene-based polymers produced using the catalyst systems disclosed herein may further include additional components such as other polymers and/or additives. Examples of additives may include, but are not limited to, antistatic agents, color enhancers, dyes, lubricants, fillers, pigments, primary antioxidants, secondary antioxidants, processing aids, UV stabilizers, and combinations thereof. In some embodiments, antioxidants, such as IRGAFOS™ 168 and IRGANOX™ 1010 antioxidants available from Ciba Geigy, may be used to protect the ethylene-based polymer compositions from thermal and/or oxidative degradation. The ethylene-based polymers may contain any amount of the additives. For example, in some embodiments, the ethylene-based polymers may include from 0.0 wt. % to 10.0 wt. %, from 0.0 wt. % to 7.0 wt. %, from 0.0 wt. % to 5.0 wt. %, from 0.0 wt. % to 3.0 wt. %, from 0.0 wt. % to 2.0 wt. %, from 0.0 wt. % to 1.0 wt. %, or even from 0.0 wt. % to 0.5 wt. % additives based on the total weight of the ethylene-based polymer compositions including such additives.

The ethylene-based polymers produced using the catalyst systems disclosed herein may be included in a wide variety of products including, in particular embodiments, LLDPE, but also high density polyethylenes (HDPE), plastomers, medium density polyethylenes, and polypropylene copolymers. For these and other applications, articles may be prepared showing enhanced overall quality due to the increased average molecular weight and high-density fraction of the ethylene-based polymer. Useful forming operations for the polymers may include, but are not limited to, film, sheet, pipe, and fiber extrusion and co-extrusion as well as blow molding, injection molding, and rotary molding may be pursued. Films may include blown or cast films formed by co-extrusion or by lamination and may be useful as shrink film, cling film, stretch film, sealing film, oriented film, snack packaging, heavy duty bags, grocery sacks, baked and frozen food packaging, medical packaging, industrial liners, agricultural film applications, and membranes, for example, in food-contact and non-food-contact applications. Fibers may include melt spinning, solution spinning, and melt blown fiber operations for use in woven and non-woven form to make filters, diaper fabrics, medical garments, and geotextiles. Extruded articles may include medical tubing, wire and cable coatings, geomembranes, and pond liners. Molded articles may include single and multi-layered constructions in the form of bottles, tanks, large hollow articles, rigid food containers, and toys.

TEST METHODS

Specific Surface Area

Specific surface area of $MgCl_2$ support was measured by Brunauer, Emmett, Teller (BET) Surface Area Method. A Tristar 3020 Surface Area Analyzer by Micromeritics was used. 30 mL of $MgCl_2$ slurry was filtered to remove solvent and then re-slurried in 30 mL of hexane. The resulting slurry was filtered again under inert atmosphere and washed with additional hexane. This process was repeated once to yield a filtercake of $MgCl_2$. Residual solvent was removed from the filtercake under vacuum. The filtercake was further dried on a Vac Prep 061 by Micromeritics using a 0.5 inch (1.27 cm) sample tube and a Transeal stopper designed for inert sample protection by loading a 0.2 g sample of the vacuum-dried $MgCl_2$ into the tube under inert atmosphere with a Transeal stopper. The sample tube was connected to the Vac Prep 061 unit with nitrogen purging. The sample tube was treated with vacuum by opening the Transeal stopper and the evacuated tube was placed in a heating block with an aluminum tube protector. The sample was dried under the vacuum on the Vac Prep 061 unit at 110° C. for 3 hours. Afterward, nitrogen was introduced into the sample tube. The dried sample was allowed to cool to room temperature before disconnecting the sample tube from the Vac Prep 061 unit to give a fully dried sample. Under inert atmosphere, 0.1500 to 0.2000 g of the fully dried sample was transferred into a clean sample tube with a tube filler rod. The sample tube was then sealed with a Transeal stopper and connected to the Tristar 3020 instrument for surface area measurement. QUICKSTART method was used for acquiring data.

Melt Index

Melt index ($I_2$), is measured in accordance with ASTM D1238, under conditions of 190° C. and 2.16 kg of load.

Melt Flow Index ($I_2$) was obtained using a CEAST 7026 or an Instron MF20 instrument. The instruments followed ASTM D1238, Methods E and N. The above methods were also used to determine the melt index ($I_{10}$) at conditions of 190° C. and 10 kg of load. The melt index ($I_2$) is reported in grams eluted per 10 minutes (g/10 min). The melt index $I_2$ was used for polymer characterization. A higher $I_2$ value may generally correlates to a lower Mw. Additionally, the melt index ratio $I_{10}/I_2$ was also used for polymer characterization. A lower $I_{10}/I_2$ may generally correlate to a narrower molecular weight distribution (MWD).

Gel Permeation Chromatography (GPC)

The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° C. and the column compartment was set at 150° C. The columns used were 3 Agilent "Mixed B" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters (µL) and the flow rate was 1.0 milliliters/minute (mL/min).

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius (° C.) with gentle agitation for 30 minutes. The polystyrene standard peak molecular weights were converted to polyethylene molecular weights using Equation 1 (EQU. 1)(as described in Williams and Ward, J. Polym. Sci., Polym. Let., 6, 621 (1968)).:

$$M_{polyethylene} = A \times (M_{polystyrene})^B \qquad \text{EQU. 1}$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2 (EQU. 2)) and symmetry (Equation 3 (EUQ. 3)) were measured on a 200 microliter injection according to the following equations:

$$\text{Plate Count} = 5.54 * \left( \frac{(RV_{Peak\ Max})}{\text{Peak Width at } \frac{1}{2} \text{height}} \right)^2 \qquad \text{EQU. 2}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/mL, and the solvent (contained 200 ppm BHT) was added to a pre nitrogen-sparged septa-capped vial, via the PolymerChar high temperature autosampler. The samples were dissolved for 2 hours at 160° C. under "low speed" shaking.

The calculations of $Mn_{(GPC)}$, $Mw_{(GPC)}$, and $MZ_{(GPC)}$ were based on GPC results using the internal IR5 detector (measurement channel) of the PolymerChar GPC-IR chromatograph according to Equations 4-6 (EQU. 4, EQU. 5, and EQU. 6) below, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^i IR_i}{\sum^i (IR_i / M_{polyethylene_i})} \qquad \text{EQU. 4}$$

$$Mw_{(GPC)} = \frac{\sum^i (IR_i \times M_{polyethylene_i})}{\sum^i IR_i} \qquad \text{EQU. 5}$$

$$Mz_{(GPC)} = \frac{\sum^i (IR_i \times M_{polyethylene_i}^2)}{\sum^i (IR_i \times M_{polyethylene_i})} \qquad \text{EQU. 6}$$

In order to monitor the deviations over time, a flowrate marker (decane) was introduced into each sample via a micropump controlled with the PolymerChar GPC-IR system. This flowrate marker (FM) was used to linearly correct the pump flowrate ($Flowrate_{(nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($Flowrate_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7 (EQU. 7). Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} \times \frac{RV_{(FM\ Calibrated)}}{RV_{(FM\ Sample)}} \quad \text{EQU. 7}$$

A calibration for the IR5 detector rationing was performed using at least ten ethylene-based polymer standards (polyethylene homopolymer and ethylene/octene copolymers) of known short chain branching (SCB) frequency (measured by the $^{13}$C NMR Method), ranging from homopolymer (0 SCB/1000 total C) to approximately 50 SCB/1000 total C, where total C=carbons in backbone+carbons in branches. Each standard had a weight-average molecular weight (Mw) of 36,000 g/mole to 126,000 g/mole, as determined by the GPC-LALLS. Each standard had a molecular weight distribution (Mw/Mn) from 2.0 to 2.5, as determined by GPC. Example polymer properties for the Copolymer standards are shown in Table A.

TABLE A

"Copolymer" Standards

| Wt % Comonomer | IR5 Area Ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "IR5$_{Methyl\ Channel\ Area}$/IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "Copolymer" standards. A linear fit of the Wt % Comonomer frequency versus the "IR5 Area Ratio" was constructed in the form of the following Equation 8 (EQU. 8):

$$(\text{Wt. \% Comonomer}) = A_0 + \left[A_1 \times \left(\frac{IR5_{Methyl\ Channel\ Area}}{IR5_{Measurement\ Channel\ Area}}\right)\right] \quad \text{EQU. 8}$$

End-Group Correction of the wt % Comonomer data can be made via knowledge of the termination mechanism if there is significant spectral overlap with the comonomer termination (methyls) via the molecular weight determined at each chromatographic slice.

Measurement of HDF (High Density Fraction)

Improved comonomer content distribution (iCCD) analysis was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N$_2$ purging capability. ODCB is sparged with dried nitrogen (N$_2$) for one hour before use. Sample preparation was done with autosampler at 4 mg/mL (unless otherwise specified) under shaking at 160° C. for 1 hour. The injection volume was 300 µL. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length) by ¼" (ID) (0.635 cm) stainless tubing. The column packing and conditioning were with a slurry method according to the reference (Cong, R.; Parrott, A.; Hollis, C.; Cheatham, M. WO2017/040127A1). The final pressure with TCB slurry packing was 150 Bars.

Column temperature calibration was performed by using a mixture of the Reference Material Linear homopolymer polyethylene (having zero comonomer content, Melt index (I$_2$) of 1.0, polydispersity M$_w$/M$_n$ approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The modeling of the reported elution peak temperatures as a function of octene mole % using linear regression resulting in the model of Equation 9 (EQU. 9) for which R2 was 0.978.

(Elution Temperature)=−6.3515(Octene Mol %)+101.000    EQU. 9

For the whole resin, integration windows are set to integrate all the chromatograms in the elution temperature (temperature calibration is specified above) range from 23.0° C. to 115° C. The weight percentage of the high density fraction (HDF) of the resin (HDF) is defined by the following Equation 10 (EQU. 10):

$$HDF = \frac{\text{(integrated area of elution window } 95-115°\text{ C.)}}{\substack{\text{(integrated area of} \\ \text{entire elution window } 23-115°\text{ C.)}}} \times 100\% \quad \text{EQU. 10}$$

EXAMPLES

Embodiments of the present disclosure will be further clarified by the following examples.

Examples 1A-1F: Batch Copolymerization of Ethylene-Based Polymer Using Heterogeneous Procatalyst with Thermally Treated MgCl$_2$ In Examples 1A-1F (1A, 1B, 1C, 1D, 1E, and 1F), batch copolymerizations of ethylene and 1-octene were performed using the heterogeneous procatalyst including the thermally treated MgCl$_2$. The heterogeneous procatalyst incorporating the thermally treated MgCl$_2$ component was prepared by first synthesizing the MgCl$_2$ particles via reacting butyl ethyl magnesium in ISOPAR™ E paraffinic solvent solution with hydrochloride gas to produce a slurry of MgCl$_2$ particles. The MgCl$_2$ slurry was stored and handled in a nitrogen purged glovebox to avoid contamination from moisture and oxygen. To thermally treat the MgCl$_2$ slurry, 2 L of the MgCl$_2$ slurry was loaded into a 5.9 liter (L) reactor via an air-tight designed transferring container, such that the MgCl$_2$ was not exposed to air or moisture. N$_2$ atmosphere was used for reactor line purging and isolation. The reactor was then heated with a heating jacket to 190° C. for 1 hour. The heating of the reactor was controlled by a step controller, with the ramping time of about one hour (from room temperature to 190° C.). After the designated heating time, the reactor was allowed to cool to room temperature in about 3 hours. During the heating process, the contents of the reactor were agitated at 100 rpm. Variations in temperature were controlled to within +/−2° C. After the reactor was cooled to room temperature, the slurry comprising the thermally treated MgCl$_2$ was transferred back into the glovebox using the air-tight transferring container to prevent exposure to air and/or moisture.

The thermally treated MgCl$_2$ was then used to produce heterogeneous procatalysts of Examples 1A-1F. In the N$_2$-purged glovebox, the heterogeneous procatalysts of Examples 1A-1F were produced via sequential addition of ethyl aluminum dichloride (EADC, Aldrich, 1.0 M in hexane) (chlorinating agent) and titanium tetraisopropoxide (TiPT, Aldrich, 0.125 M in ISOPAR™ E solvent) (titanium species) to the slurry containing the thermally treated MgCl$_2$ according to the following process. For each heterogeneous procatalyst, 10 mL of the thermally treated MgCl$_2$ slurry was maintained under constant stirring in a capped glass vial. On the first day, a designated amount of the 1.0 M EADC solution was added to the thermally treated MgCl$_2$ slurry, and the resulting slurry was left stirring overnight. On the second day, a designated amount of the 0.125 M TiPT solution was added, and the resulting slurry was left stirring overnight. The heterogeneous procatalyst was ready for use on the third day. The designated amounts of EADC solution and TiPT solution as well as the molar ratios of the MgCl$_2$ to the EADC to the TiPt (MgCl$_2$/EADC/TiPT) for each of the heterogeneous procatalysts of Examples 1A-1F are provided below in Table 1.

For Examples 1A-1F, the batch copolymerization reactions were conducted in a 2 L Parr batch reactor. The reactor was heated by an electrical heating mantle and cooled by an internal serpentine cooling coil using water. The bottom of the reactor was fitted with a dump valve for emptying the reactor contents into a stainless steel dump pot pre-filled with a catalyst kill solution (typically 5 mL mixture of IRGAFOS® organophosphite processing stabilizer from BASF, IRGANOX® antioxidant from BASF, and toluene). The dump pot was vented to a blow down tank under continuous N$_2$ purge. All solvents used for the copolymerization and catalyst makeup were passed through purification columns, to remove impurities. The solvents were passed through 2 columns: the first containing A2 alumina and the second containing reduced copper on alumina (Q5 reactant). The ethylene was passed through 2 columns: the first containing A204 alumina and 4 Angstrom (Å) molecular sieves, the second containing Q5 reactant. The N$_2$ was passed through a single column containing A204 alumina, 4 Å molecular sieves, and Q5 reactant.

The reactor was loaded first with 664 grams (g) ISOPAR™ E solvent and 134±2 g 1-octene from a separate tank, which was filled to the load set points using an Ashcroft differential pressure cell. 14.8±0.3 mmol hydrogen was added after solvent addition and the reactor was heated to 190° C. 56±1 g ethylene was then added to the reactor when at the reaction temperature to reach reaction pressure (i.e., 475 psi). Further ethylene addition amounts during the polymerization reaction were monitored by a micro-motion flow meter.

For each of Examples 1A-1F, an amount of the heterogeneous procatalyst slurry was pipetted into a 5 mL vial and then taken up in a 20 mL syringe with an 18 gauge needle. The vial was rinsed with solvent and the rinses were also taken into the syringe. A double-ended septa sealed vial was used to cap the syringe for transportation outside the glovebox to the batch reactor. Additionally, an amount of a cocatalyst solution of triethyl aluminum in a solvent (TEA, 1.00-0.05 M solution in ISOPAR™ E solvent) was pipetted into a separate 5 mL vial and then taken up in a separate 20 mL syringe with an 18 gauge needle. For each of Examples 1A to 1D, the amount of the heterogeneous procatalyst slurry contained 1.5 µmol of Ti, and the amount of the cocatalyst solution contained 12.0 µmol of TEA. For Examples 1E and 1F, the amount of heterogeneous procatalyst contained 2.2 µmol of Ti, and the amount of cocatalyst solution contained 17.6 µmol of TEA.

The heterogeneous procatalyst and TEA cocatalyst solution were taken up in separate syringes and were injected within several minutes of being prepared. The heterogeneous procatalyst slurry and cocatalyst solution were each injected into a shot tank attached to the reactor under the flow of N$_2$. The heterogeneous procatalyst slurry was prepared second but injected first, and the TEA solution was rinsed three times (2.5, 2.5, 5 mL). The mixture of the two solutions was maintained in the shot tank for 5 minutes, and then introduced to the reactor under a 150 psi differential pressure after the reactor set points were achieved.

After injection of the catalyst system (heterogeneous procatalyst and cocatalyst solution), the copolymerization reaction was initiated to produce the ethylene-based polymers. The reaction mixture was collected for analysis in a stainless steel pan for solvent removal. The reactor was washed twice with 850 g of ISOPAR™ E solvent at a temperature between 140° C. and 160° C. The first wash was collected and combined with the reaction mixture. The ethylene-based polymer samples collected for each of Examples 1A-1F were air dried overnight to remove the majority of solvent and then placed in a vacuum oven under $N_2$ to further remove trapped solvent. The vacuum oven was designed to do the following: cycle three times between 5 minutes nitrogen flow and vacuum to 40 Torr, ramp temperature 1° C./min to 80° C. and hold for three hours under vacuum, then ramp to 140° C. and hold for 4 hours. The cooled ethylene-based polymers of Examples 1A-1F were then analyzed for Mw, melt index ($I_2$), HDF wt. %, according to the test methods described herein. The results are provided below in Table 2.

Examples 2A-2B: Batch Copolymerization of Ethylene-Based Polymer Using Heterogeneous Procatalyst with Thermally Treated MgCl$_2$ In Examples 2A and 2B, batch copolymerization reactions of ethylene and 1-octene were performed using a heterogeneous procatalyst that included MgCl$_2$ thermally treated at 190° C. for 24 hours. The MgCl$_2$ slurry was first produced by reacting butyl ethyl magnesium in ISOPAR™ E solvent with hydrochloride gas to produce a slurry of MgCl$_2$ particles in the solution (diluent). The MgCl$_2$ slurry was stored and handled in a nitrogen purged glovebox to avoid contamination from moisture and oxygen. For Examples 2A and 2B, 150 mL of the MgCl$_2$ slurry was loaded into a 300 mL stainless steel Parr reactor within the N$_2$ purgebox and the reactor was sealed. The Parr reactor was then taken out of the N$_2$ purgebox and heated with a heating jacket to a temperature of 190° C. and maintained at 190° C. for 24 hours. The heating of the reactor was controlled by a step controller, with the ramping time of about 30 minutes (from room temperature to 190° C.). After the designated heating time, the reactor was allowed to cool to room temperature in about 1.5 hours. During the heating process, the contents of the reactor kept static without agitation. Variations in temperature were controlled to within +/−2° C. After cooling the reactor to room temperature, the reactor was transferred back into the purgebox, and the thermally treated MgCl$_2$ was collected without exposure to air and/or moisture.

The thermally treated MgCl$_2$ was then used to produce heterogeneous procatalysts of Examples 2A and 2B via sequential addition of EADC and TiPT to the slurry containing the thermally treated MgCl$_2$, according to the process described in Examples 1A-1F. The designated amounts of the EADC solution and the TiPT solution and the molar ratios of the MgCl$_2$ to the EADC to the TiPt (MgCl$_2$/EADC/TiPT) for the heterogeneous procatalysts of Examples 2A and 2B are provided below in Table 1.

For Examples 2A and 2B, the batch copolymerizations were conducted in a 2 L Parr batch reactor according to the copolymerization process described in Examples 1A-1F. The reaction conditions and reactor parameters were the same as described in Examples 1A-1F except for the amounts of the heterogeneous procatalyst and TEA solution charged to the reactor. For Examples 2A and 2B, the charged amount of the heterogeneous procatalyst slurry contained 1.4 μmol Ti, and the charged amount of the cocatalyst solution contained 11.2 μmol TEA. The ethylene-based polymers of Examples 2A and 2B were collected and analyzed for Mw, melt index ($I_2$), and HDF wt. %, according to the test methods described herein. The results are provided below in Table 2.

Comparative Examples CE1 and CE2: Batch Copolymerization of Ethylene-Based Polymer Using Heterogeneous Procatalyst with Non-Thermally Treated MgCl$_2$ In Comparative Examples CE1 and CE2, batch copolymerization reactions of ethylene and 1-octene were conducted using a heterogeneous procatalyst that included MgCl$_2$ that was not subjected to thermal treatment. The MgCl$_2$ for Comparative Examples CE1 and CE2 was prepared by synthesizing the MgCl$_2$ particles via reacting butyl ethyl magnesium in ISOPAR™ E solvent with hydrochloride gas to produce a slurry of MgCl$_2$ particles in the solution (diluent). The MgCl$_2$ slurry was stored and handled in a nitrogen purged glovebox to avoid contamination from moisture and oxygen. For Comparative Examples CE1 and CE2, the MgCl$_2$ was not thermally treated. The non-thermally treated MgCl$_2$ slurry was used to produce the heterogeneous procatalysts of CE1 and CE2 via sequential addition of EADC and TiPT to the MgCl$_2$ slurry, according to the process of Examples 1A-1F. The designated amounts of the EADC solution and the TiPT solution and the molar ratios of the MgCl$_2$ to the EADC to the TiPT (MgCl$_2$/EADC/TiPT) for the procatalysts of CE1 and CE2 are provided below in Table 1.

For CE1 and CE2, the batch copolymerizations were conducted in a 2 L Parr batch reactor according to the copolymerization process described in Examples 1A-1F. The reaction conditions and reactor parameters for CE1 and CE2 were the same as described in Examples 1A-1F except for the amounts of the heterogeneous procatalyst and TEA solution charged to the reactor. For CE1 and CE2, the charged amount of the heterogeneous procatalyst slurry (110 μL) contained 1.4 μmol Ti, and the charged amount of the cocatalyst solution contained 11.2 μmol TEA. The ethylene-based polymers produced in CE1 and CE2 were collected and analyzed for Mw, melt index ($I_2$), and HDF wt. %, according to the test methods described herein. The results are provided below in Table 2.

Example 3: Comparison of Examples 1A-1F and Examples 2A and 2B with Comparative Examples CE1 and CE2

The following Table 1 provides the composition parameters for each of the heterogeneous procatalysts of Examples 1A-1F, 2A, and 2B and Comparative Examples CE1 and CE2. Table 1 also provides the temperature and treatment time of the thermal treatment of the MgCl$_2$ for Examples 1A-1F and Examples 2A and 2B.

TABLE 1

Heat treatment parameters and heterogeneous procatalyst compositions for Examples 1A-1F, 2A, and 2B and Comparative Examples CE1 and CE2.

| | MgCl$_2$ Heat Treatment | | Heterogeneous Procatalyst Composition | | |
|---|---|---|---|---|---|
| | Temp (° C.) | Time (hrs) | EADC (μL) | TiPT (μL) | MgCL$_2$/EADC/TiPT (mol/mol/mol) |
| 1A | 190 | 1.0 | 337 | 673 | 40.0/6.8/1.7 |
| 1B | 190 | 1.0 | 600 | 1200 | 40.0/12.0/3.0 |
| 1C | 190 | 1.0 | 863 | 1726 | 40.0/17.2/4.3 |
| 1D | 190 | 1.0 | 1151 | 2302 | 40.0/23.2/5.8 |
| 1E | 190 | 1.0 | 1438 | 2877 | 40.0/28.8/7.2 |
| 1F | 190 | 1.0 | 1726 | 3452 | 40.0/32.4/8.6 |
| 2A | 190 | 24.0 | 209 | 418 | 40.0/4.0/1.0 |
| 2B | 190 | 24.0 | 607 | 1215 | 40.0/12.0/3.0 |
| CE1 | — | — | 599 | 1199 | 40.0/12.0/3.0 |
| CE2 | — | — | 599 | 1199 | 40.0/12.0/3.0 |

The following Table 2 includes the Mw, melt index ($I_2$), and HDF wt. % measurements for the ethylene-based polymers of Examples 1A-1F, 2A, and 2B and Comparative Examples CE1 and CE2. In Table 2, the change in Mw (ΔMw), change in $I_2$ (Δ$I_2$), and change in HDF wt. % (ΔHDF wt. %) for Examples 1A-1F, 2A and 2B are calculated as a comparison of these properties to the average of Comparative Examples CE1 and CE2.

TABLE 2

Mw, $I_2$, and HDF wt. % Test Data for Examples 1A-1F, 2A, and 2B and Comparative Examples CE1 and CE2

| | Mw (Dalton) | ΔMw (%) | $I_2$ (g/10 min) | Δ$I_2$ (%) | HDF (wt. %) | ΔHDF (%) |
|---|---|---|---|---|---|---|
| 1A | 106,362 | 6.02 | 1.41 | 21.23 | 23.80 | 78.68 |
| 1B | 113,116 | 12.75 | 1.24 | 30.73 | 30.73 | 130.71 |
| 1C | 115,820 | 15.45 | 1.11 | 37.99 | 37.05 | 178.15 |
| 1D | 118,823 | 18.44 | 1.38 | 22.91 | 38.12 | 186.19 |
| 1E | 118,368 | 17.99 | 1.27 | 29.05 | 38.36 | 187.99 |
| 1F | 116,360 | 15.99 | 1.01 | 43.58 | 41.97 | 215.09 |
| 2A | 131,164 | 30.74 | 0.84 | 53.07 | 22.26 | 67.12 |
| 2B | 134,272 | 33.84 | 1.51 | 15.64 | 36.29 | 172.45 |
| CE1 | 100,660 | N/A | 1.77 | N/A | 12.66 | N/A |
| CE2 | 99,984 | N/A | 1.80 | N/A | 13.98 | N/A |

Comparison of the ethylene-based polymers produced in Examples 1A-1F, 2A, and 2B with those produced in Comparative Examples CE1 and CE2 demonstrates that including the thermally treated $MgCl_2$ in the heterogeneous procatalyst increases the Mw and HDF wt. % and decreases the $I_2$ of the ethylene-based polymers compared to the comparative ethylene-based polymers of CE1 and CE2 produced with procatalysts that included non-thermally treated $MgCl_2$. Thus, it is shown that a heterogeneous procatalyst that includes $MgCl_2$ that has been thermally treated before adding the EADC (chlorinating agent) and titanium species may produce an ethylene-based polymer having increased Mw and HDF and decreased $I_2$ compared to comparative polymers made with procatalysts having non-thermally treated $MgCl_2$.

Examples 4A-4D: Batch Copolymerization Using Heterogeneous Procatalyst Prepared by Thermally Treating the $MgCl_2$ after Addition of the Chlorinating Agent and Ti Species For Examples 4A-4D (4A, 4B, 4C, and 4D), batch copolymerizations of ethylene and 1-octene were performed using a heterogeneous procatalyst prepared by thermally treating the $MgCl_2$ after adding the chlorinating agent and titanium species to the $MgCl_2$. Before the copolymerization processes were performed, the heterogeneous procatalyst was synthesized. The $MgCl_2$ was first produced by synthesizing the $MgCl_2$ particles via reacting butyl ethyl magnesium in ISOPAR™ E paraffinic solvent solution with hydrochloride gas to produce a slurry of $MgCl_2$ particles in the solution (diluent). The $MgCl_2$ slurry was stored and handled in an inert atmosphere to avoid contamination from moisture and oxygen.

The $MgCl_2$ slurry was then used to produce the heterogeneous procatalysts of Examples 4A-4D by sequential addition of EADC (Aldrich, 1.0 M EADC in hexane) (chlorinating agent) and TiPT (Aldrich, 0.125 M TiPT in ISOPAR™ E solvent) (titanium species) to the $MgCl_2$ slurry. For each heterogeneous procatalyst, the $MgCl_2$ slurry was maintained under constant stirring, and a designated amount of the 1.0 M EADC solution was added to the $MgCl_2$ slurry and mixed for a period of time. A designated amount of the 0.125 M TiPT solution was then added, and the resulting heterogeneous procatalyst slurry was mixed for another period of time. The heterogeneous procatalysts of Examples 4A-4D each had a molar ratio of $MgCl_2$ to EADC to TiPT ($MgCl_2$/EADC/TiPT) of 40/12/3.

A 5.9 liter (L) reactor was used to thermally treat the heterogeneous procatalyst slurry comprising the $MgCl_2$, EADC and TiPT added. 2 L of the heterogeneous procatalyst slurry was loaded into the reactor via an air-tight designed transferring container, such that the $MgCl_2$ was not exposed to air or moisture. $N_2$ atmosphere was used for reactor line purging and isolation. The reactor was then heated with a heating jacket to 190° C. The heating of the reactor was controlled by a step controller, with the ramping time of about one hour (from room temperature to 190° C.). During the heating process, the contents of the reactor were agitated at 100 rpm. Variations in temperature were controlled to within +/−2° C. Each heterogeneous procatalysts of Examples 4A-4D was subjected to a different thermal treatment time. After the designated thermal treatment time elapsed for one of Examples 4A-4D, an aliquot of the heterogenous procatalyst was collected from the reactor using a sampling system under $N_2$ protection using pressure transferring to prevent contact of the catalyst with air or moisture. Samples of the thermally treated heterogeneous procatalyst were collected after 1 hour (Ex. 4A), 3 hours (Ex. 4B), 6 hours (Ex. 4C), and 10 hours (Ex. 4D).

The thermally treated heterogeneous procatalysts of Examples 4A-4B were then utilized to conduct copolymerizations of ethylene and 1-octene to produce ethylene-based polymers. For Examples 4A-4D, the batch copolymerizations were conducted in a 2 L Parr batch reactor. The reactor was heated by an electrical heating mantle and cooled by an internal serpentine cooling coil using water. The bottom of the reactor was fitted with a dump valve for emptying the reactor contents into a stainless steel dump pot pre-filled with a catalyst kill solution (typically 5 mL mixture of IRGAFOS® organophosphite processing stabilizer from BASF, IRGANOX® antioxidant from BASF, and toluene). The dump pot was vented to a blow down tank under continuous $N_2$ purge. All solvents used for the copolymerization and catalyst makeup were passed through purification columns, to remove impurities. The solvents were passed through 2 columns: the first containing A2 alumina and the second containing reduced copper on alumina (Q5 reactant). The ethylene was passed through 2 columns: the first containing A204 alumina and 4 Angstrom (Å) molecular sieves, the second containing Q5 reactant. The $N_2$ was passed through a single column containing A204 alumina, 4 Å molecular sieves, and Q5 reactant.

The reactor was loaded first with 662±1 grams (g) ISOPAR™ E solvent and 131 g 1-octene from a separate tank, which was filled to the load set points using an Ashcroft differential pressure cell. 11.2 mmol hydrogen was added after solvent addition and the reactor was heated to 190° C. 56±1 g ethylene was then added to the reactor when at the reaction temperature to reach reaction pressure (i.e., 475 psi). Further ethylene addition amounts during the polymerization reaction were monitored by a micro-motion flow meter.

For each of Examples 4A-4D, 110 μL of the thermally treated heterogeneous procatalyst was pipetted into a 5 ml vial and then taken up in a 20 mL syringe with an 18 gauge needle. The vial was rinsed with solvent and the rinses were also taken into the syringe. A double-ended septa sealed vial was used to cap the syringe for transportation outside the glovebox to the batch reactor. Additionally, 11.2 μmol TEA (1.00-0.05 M solution in ISOPAR™ E solvent) was pipetted into a separate 5 mL vial and then taken up in a separate 20 mL syringe with an 18 gauge needle. The thermally treated heterogeneous procatalyst and TEA solution were added to the reaction system and the reaction was conducted according to the process described previously in Examples 1A-1F. The ethylene-based polymers collected from the reactor system for Examples 4A-4D were then analyzed for Mw, melt index ($I_2$), comonomer weight percent (C8 wt. %), and HDF wt. %, according to the test methods described herein. The results are provided below in Table 3.

Comparative Example CE3: Batch Copolymerization of Ethylene-Based Polymer Using Non-Thermally Treated Heterogeneous Procatalyst For Comparative Example CE3, batch copolymerization of ethylene and 1-octene was performed using a heterogeneous procatalyst without thermally treating the heterogeneous procatalyst. Before the copolymerization process was performed, the heterogeneous procatalyst was synthesized via reacting butyl ethyl magnesium in ISOPAR™ E solvent solution with hydrochloride gas to produce a slurry of $MgCl_2$ particles in the solution (diluent). The $MgCl_2$ slurry was stored and handled in a nitrogen purged glovebox to avoid contamination from moisture and oxygen. The $MgCl_2$ slurry was then used to produce the heterogeneous procatalysts of CE3 via sequential addition of EADC and TiPT as previous described in Examples 4A-4D. The heterogeneous procatalyst of CE3 was not subsequently subjected to a thermal treatment. The heterogeneous procatalysts of CE3 had a molar ratio of $MgCl_2$ to EADC to TiPT ($MgCl_2$/EADC/TiPT) of 40/12/3.

Example 5: Comparison of Examples 4A-4D and Comparative Example CE3

The following Table 3 provides the Mw, melt index ($I_2$), C8 wt. %, and HDF wt. % measurements for the ethylene-based polymers of Examples 4A-4D and Comparative Example CE3. In Table 3, the change in Mw ($\Delta$Mw) and change in HDF wt. % ($\Delta$HDF wt. %) for Examples 4A-4D are calculated as a comparison to Comparative Examples CE3. Table 3 also provides the thermal treatment conditions for the heterogeneous procatalysts of Examples 4A-4D.

chlorinating agent (EADC) and titanium species (TiPT) can produce a heterogeneous procatalyst capable of producing an ethylene-based polymer exhibiting increased Mw and HDF and decreased C8 wt. % and $I_2$ compared to procatalysts that include non-thermally treated $MgCl_2$.

Example 6: Batch Copolymerization Utilizing the Heterogeneous Procatalyst of Example 4B with Decreased Ethylene and Increased Hydrogen For Example 6, a batch copolymerization of ethylene and 1-octene was performed using the heterogeneous procatalyst of Example 4B. The batch copolymerization was conducted in accordance with the copolymerization process previously described in Examples 4A-4D, except that the amount of ethylene added to the reactor was reduced to 53±1 g and the amount of hydrogen charged to the reactor was increased to 44.9±0.1 mmol hydrogen. All other reactor conditions were the same as described in Examples 4A-4D.

Comparative Example CE4: Batch Copolymerization Utilizing the Procatalyst of CE3 with Decreased Ethylene and Increased Hydrogen For Comparative Example CE4, a batch copolymerization of ethylene and 1-octene was performed using the heterogeneous procatalyst of Comparative Example CE3, which was not subjected to thermal treatment. The batch copolymerization was conducted in accordance with the copolymerization process previously described in Example 6, which included the process described in Examples 4A-4D with decreased ethylene and increased hydrogen.

Example 7: Comparison of Example 6 to Comparative Example CE4

The ethylene-based polymers collected from the copolymerization reactors for Example 6 and Comparative Example CE4 were analyzed for Mw, melt index ($I_2$), and

TABLE 3

Mw, $I_2$, C8 wt. %, and HDF wt. % Test Data for Examples 4A-4D and Comparative Example CE3

|  | Thermal Treatment | | Properties of Ethylene-Based Polymer | | | | | | | |
| --- | --- | --- | --- | --- | --- | --- | --- | --- | --- | --- |
|  | T (° C.) | Time (hrs) | Mw (Dalton) | ΔMw (%) | $I_2$ (g/10 min) | Δ$I_2$ (%) | C8 wt. % | ΔC8 (%) | HDF (wt. %) | ΔHDF (%) |
| 4A | 190 | 1 | 119454 | 28 | 1.39 | −17 | 2.30 | −63 | 34.63 | 73 |
| 4B | 190 | 3 | 129942 | 39 | 1.29 | −23 | 4.43 | −28 | 37.17 | 86 |
| 4C | 190 | 6 | 113529 | 22 | 1.23 | −26 | 4.89 | −21 | 37.20 | 86 |
| 4D | 190 | 10 | 114163 | 23 | 1.23 | −26 | 4.46 | −28 | 37.73 | 89 |
| CE3 | — | — | 93158 | — | 1.67 | — | 6.16 | — | 20.01 | — |

Comparison of the ethylene-based polymers of Examples 4A-4D to those of Comparative Example CE3 demonstrates that thermally treating the $MgCl_2$ after addition of the comonomer weight percent (C8 wt. %), according to the test methods described herein. The results are provided below in Table 4.

TABLE 4

Mw, $I_2$, and C8 wt. % Test Data for Example 6 and Comparative Example CE4

| | Thermal Treatment | | Properties of Ethylene-Based Polymer | | | | | |
|---|---|---|---|---|---|---|---|---|
| | T (° C.) | Time (hours) | Mw (Dalton) | ΔMw (%) | $I_2$ (g/10 min) | $ΔI_2$ (%) | C8 wt. % | ΔC8 (%) |
| 6 | 190 | 3 | 63617 | 5.4 | 9.78 | −2.6 | 6.8 | −22.3 |
| CE4 | — | — | 60344 | — | 10.04 | — | 8.75 | — |

Comparison of the ethylene-based polymer of Example 6 with that of Comparative Example CE4 demonstrates that a heterogeneous procatalyst having $MgCl_2$ that has been thermally treated after addition of the chlorinating agent (EADC) and the titanium species (TiPT) can produce ethylene-based polymers having increased Mw and decreased C8 wt. % and $I_2$ compared to CE4 even when additional hydrogen is introduced to the reactor system, which is expected to limit the formation of high-molecular weight molecules in the reactor.

Example 8: Batch Copolymerization Utilizing a Thermally Treated Heterogeneous Procatalyst For Example 8, batch copolymerizations of ethylene and 1-octene were performed using a heterogeneous procatalyst prepared by thermally treating the heterogeneous procatalyst under different thermal treatment conditions. The heterogeneous procatalyst was first synthesized by preparing the $MgCl_2$ and sequentially adding EADC and TiPT to the $MgCl_2$ slurry as described in Examples 4A-4D.

The heterogeneous procatalyst of Example 8 was then thermally treated. For the thermal treatment, 25 mL of the heterogeneous procatalyst of Example 8 and a flea-sized magnetic stir bar were placed in a thick-walled glass tube having a length of 10 inches (25.4 millimeters (mm)) and an inside diameter of 0.75 inch (19.05 mm). The heterogeneous procatalyst in the glass tube exhibited a tan color prior to thermal treatment. The glass tube was sealed tightly with a PTFE threaded cap and placed in a heating block. The heterogeneous procatalyst was then heated to a temperature of 150° C. and maintained at 150° C. for 60 hours. The glass tube was cooled to ambient temperature and the heterogeneous procatalyst was transferred to a scintillation vial for subsequent use.

The thermally treated heterogeneous procatalyst was then utilized in batch copolymerizations of ethylene and 1-octene to produce the ethylene-based polymers of Example 8. The batch copolymerization process was conducted according to the process previously described in Examples 4A-4D except that no hydrogen (0.0 mmol $H_2$) was used in the batch copolymerization reaction and 62±1 g of ethylene was initially loaded into the reactor. All other reactor processing conditions and parameters were the same as in Examples 4A-4D. The batch copolymerization of Example 8 was conducted two times. The ethylene-based polymers for the two reaction runs of Example 8 (Samples 8-A and 8-B) were collected for further analysis.

Comparative Example CE5: Batch Copolymerization Utilizing the Procatalyst of CE3 with the Reaction Conditions of Example 8.

For Comparative Example CE5, a batch copolymerizations of ethylene and 1-octene was performed using the heterogeneous procatalyst of Comparative Example CE3, which was not subjected to thermal treatment. The batch copolymerizations of CE5 was conducted in accordance with the copolymerization process previously described in Example 8, which included the process described in Examples 4A-4D with no hydrogen added to the reactor system and 62±1 g of ethylene. The ethylene-based polymers of CE5 were collected for analysis.

Example 9: Comparison of Example 8 to Comparative Example CE5

The ethylene-based polymers collected from the copolymerization reactors for Example 8 and Comparative Example CE5 were analyzed for Mw and C8 wt. %, according to the test methods described herein. Two samples of each ethylene-based polymers were analyzed. The results are provided below in Table 5. The Δ Mw and Δ C8 wt. % were calculated as a comparison to the average Mw and C8 wt. %, respectively, for CE5-A and CE5-B.

TABLE 5

Mw and C8 wt. % Test Data for Example 8 and Comparative Example CE5

| | Thermal Treatment | | Properties of Ethylene-Based Polymer | | | |
|---|---|---|---|---|---|---|
| | T (° C.) | Time (hours) | Mw (Dalton) | ΔMw (%) | C8 wt. % | ΔC8 (%) |
| 8-A | 150 | 60 | 248913 | 18.5 | 6.87 | −29.1 |
| 8-B | 150 | 60 | 273477 | 30.2 | 7.76 | −19.9 |
| CE5-A | — | — | 216109 | — | 8.75 | — |
| CE5-B | — | — | 203916 | — | 10.63 | — |

Comparison of the ethylene-based polymers of Examples 8A and 8B with that of Comparative Examples CE5-A and CE5-B demonstrates that a heterogeneous procatalyst having $MgCl_2$ that has been thermally treated after addition of the chlorinating agent (EADC) and the titanium species (TiPT) can produce ethylene-based polymers having increased Mw and decreased C8 wt. % and $I_2$ compared to the polymers of CE5-A and CE5-B when no hydrogen is present in the reactor system.

Examples 10A-10C: Batch Copolymerizations Using a Heterogeneous Procatalyst Including a Thermally Treated $MgCl_2$ Component and $VOCl_3$ as a Vanadium Species In Examples 10A-10C (10A, 10B, and 10C), batch copolymerizations of ethylene and 1-octene were performed using a heterogeneous procatalyst that included thermally treated $MgCl_2$ and a vanadium species in combination with the EADC chlorinating agent and $TiCl_4$ titanium species. Before the copolymerization processes, the heterogeneous procatalysts incorporating the thermally treated $MgCl_2$ component and vanadium species were synthesized. The thermally treated $MgCl_2$ component was synthesized and thermally treated according to the process previously described in Examples 1A-1F.

The thermally treated $MgCl_2$ was then used to produce heterogeneous procatalysts of Examples 10A-1C via sequential addition of EADC (Aldrich, 1.0 M in hexane), titanium chloride ($TiCl_4$, Aldrich, 0.125 M in ISOPAR™ E solvent), and a vanadium species to the slurry containing the thermally treated $MgCl_2$ according to the following process. For each heterogeneous procatalyst, 10 milliliters (mL) of the thermally treated $MgCl_2$ slurry was maintained under constant stirring in a capped glass vial. On the first day, a designated amount of the 1.0 M EADC solution was added to the thermally-treated $MgCl_2$ slurry and was left stirring overnight. On the second day, designated amounts of the 0.125 M $TiCl_4$ solution and the vanadium species solution were added, and the resulting slurry was left stirring overnight. The heterogeneous procatalyst was ready for use on the third day. For Examples 10A-10C, the vanadium species was vanadium oxytrichloride ($VOCl_3$, 0.125 M solution in ISOPAR™ E solvent). The molar ratios of the $MgCl_2$ to the EADC to the $TiCl_4$ to the vanadium species ($MgCl_2$/EADC/$TiCl_2$/V) and the temperature and time for the $MgCl_2$ thermal treatment for each of the heterogeneous procatalysts of Examples 10A-10C are provided below in Table 6.

The heterogeneous procatalysts of Examples 10A-10C were then used in batch copolymerization reactions conducted according to the process previously described in Examples 1A-1F. In Examples 10A-10C, the reactant charges to the reactor were 660 g ISOPAR™ E solvent, 132 g of 1-octene, 14.5 mmol hydrogen, and 56 g ethylene. For the catalyst systems of Examples 10A-10C, 16 mole equivalents of TEA (an amount of TEA to produce a molar ratio of TEA to Ti in the catalyst system of 16:1) was combined with the heterogeneous procatalyst in the shot tank before injection into the reactor. The ethylene-based polymers of Examples 10A-10C were collected for further analysis.

Examples 11A and 11B: Batch Copolymerizations Using a Heterogeneous Procatalyst Including a Thermally Treated $MgCl_2$ Component and $VO(O^nPr)_3$ as the Vanadium Species For Examples 11A and 11B, the batch copolymerizations were conducted using a heterogeneous procatalyst that included the thermally treated $MgCl_2$ and vanadium oxypropoxide ($VO(O^nPr)_3$) as the vanadium species. The heterogeneous procatalysts of 11A and 11B were prepared in accordance with the process previously described in Examples 10A-10C except that the $VO(O^nPr)_3$ was used for the vanadium species. The molar ratios of the $MgCl_2$ to the EADC to the $TiCl_4$ to the vanadium species ($MgCl_2$/EADC/$TiCl_2$/V) and the temperature and time for the $MgCl_2$ thermal treatment for each of the heterogeneous procatalysts of Examples 11A-11B are provided below in Table 6. The heterogeneous procatalysts of Examples 11A and 11B were then used in batch copolymerization processes conducted according to the process previously described in Examples 10A-10C to produce ethylene-based polymers, which were collected for further analysis.

Examples 12A-12C: Batch Copolymerizations Using a Heterogeneous Procatalyst Including a Thermally Treated $MgCl_2$ Component and $VO(O^nPr)_3$ as the Vanadium Species For Examples 12A-12C (12A, 12B, and 12C), the batch copolymerizations were conducted using a heterogeneous procatalyst that included the thermally treated $MgCl_2$ and $VO(O^nPr)_3$ as the vanadium species. The heterogeneous procatalysts of 12A-12C were prepared by the process previously described in Examples 11A and 11B except that the conditions for thermal treatment of the $MgCl_2$ were varied. The molar ratios of the $MgCl_2$ to the EADC to the $TiCl_4$ to the vanadium species ($MgCl_2$/EADC/$TiCl_2$/V) and the temperature and time for the $MgCl_2$ thermal treatment for each of the heterogeneous procatalysts of Examples 12A-12C are provided below in Table 6. The heterogeneous procatalysts of Examples 12A-12C were then used in batch copolymerization processes conducted according to the process previously described in Examples 10A-10C to produce ethylene-based polymers, which were collected for further analysis.

Example 13: Batch Copolymerizations Using a Heterogeneous Procatalyst Including a Thermally Treated $MgCl_2$ Component and $VOCl_3$ as the Vanadium Species For Example 13, the batch copolymerization was conducted using a heterogeneous procatalyst that included the thermally treated $MgCl_2$ and $VOCl_3$ as the vanadium species. The heterogeneous procatalyst Example 13 was prepared by the process previously described in Examples 10A-10C except that the MgCl2 was thermally treated at 190° C. for 1 hour. The molar ratios of $MgCl_2$ to EADC to Ti to V were also modified. Additionally, 0.5 mole equivalent (to $TiCl_4$) of zirconium tetrakis(2,2,6,6-tetramethyl-3,5-heptanedionate) ($Zr(TMHD)_4$) was added to the formulation together with the $VOCl_3$ during the formulation process. 0.125 mole/L of $Zr(TMHD)_4$ in ISOPAR™ E solvent solution was prepared by dissolving $Zr(TMHD)_4$ solid in the ISOPAR™ E solvent. The heterogeneous procatalyst of Example 13 had a molar ratio of Ti to V to Zr of 1:2:0.5. The molar ratios of the $MgCl_2$ to the EADC to the $TiCl_4$ to the vanadium species ($MgCl_2$/EADC/$TiCl_2$/V) and the temperature and time for the $MgCl_2$ thermal treatment for Example 13 are provided below in Table 6. The heterogeneous procatalyst of Examples 13 was then used in a batch copolymerization process conducted according to the process previously described in Examples 10A-10C to produce ethylene-based polymers, which were collected for further analysis.

Examples 14A-14C: Batch Copolymerization with Heterogeneous Procatalysts Including Thermally Treated $MgCl_2$ with No Vanadium Species For Examples 14A-14C, batch copolymerizations were conducted using a heterogeneous procatalyst having thermally treated $MgCl_2$. The heterogeneous procatalysts of 14A-14C were prepared by the process previously described in Examples 10A-10C except that no vanadium species was included in the synthesis. The molar ratios of the $MgCl_2$ to the EADC to the $TiCl_4$ ($MgCl_2$/EADC/$TiCl_2$) and the temperature and time for the $MgCl_2$ thermal treatment for each of the heterogeneous procatalysts of Examples 14A-14C are provided below in Table 6. The heterogeneous procatalysts of Examples 14A-14C were then used in batch copolymerization processes conducted according to the process previously described in Examples 10A-10C to produce ethylene-based polymers, which were collected for further analysis.

Comparative Examples CE6A-CE6C: Batch Copolymerization Utilizing Heterogeneous Procatalysts with Non-Thermally Treated $MgCl_2$ For Comparative Examples CE6A-CE6C, batch copolymerizations were conducted using a heterogeneous procatalyst for which the $MgCl_2$ was not thermally treated. The heterogeneous procatalysts of CE6A-CE6C were prepared by the process previously described in Examples 10A-10C except that the $MgCl_2$ was not thermally treated. For CE6A, $VOCl_3$ was added as the vanadium species. For CE6B and CE6C, no vanadium species was added to the heterogeneous procatalyst. Additionally, 0.5 mole equivalent (to $TiCl_4$) of zirconium tetrakis(2,2,6,6-tetramethyl-3,5-heptanedionate) (Zr(TMHD)$_4$) was added to the heterogeneous procatalyst of CE6A together with the VOCl$_3$ during procatalyst synthesis as previously described in Example 13. The heterogeneous procatalyst of CE6A had a molar ratio of Ti to V to Zr of 1:2:0.5. For CE6B, TiPT was used instead of TiCl$_4$ as the Ti species. The molar ratios of the MgCl$_2$ to EADC to Ti to V (MgCl$_2$/EADC/TiCl$_2$/V) for each of the heterogeneous procatalysts of CE6A-CE6C are provided below in Table 6. The heterogeneous procatalysts of CE6A-CE6C were then used in batch copolymerization processes conducted according to the process previously described in Examples 10A-10C to produce ethylene-based polymers. For CE6B, 8 mole equivalent of TEA was combined with the heterogeneous procatalyst so that the molar ratio of TEA to Ti in the catalyst system was 8:1 instead of 16:1. The ethylene-based polymers were collected for further analysis.

Example 15: Comparison

The following Table 6 provides the synthesis information for the heterogeneous procatalysts produced in Examples 10A-10C, 11A-11B, 12A-12C, 13, and 14A-14C and Comparative Examples CE6A-CE6B.

TABLE 6

Composition and Thermal Treatment Conditions for Examples 10A-10C, 11A, 11B, 12A-12C, 13, and 14A-14C and Comparative Examples CE6A-CE6C

| Sample | Thermal Treatment T (° C.) | Thermal Treatment Time (hours) | Ti Species | V Species | TEA/Ti (mol/mol) | MgCl$_2$/EADC/Ti/V/Zr (mol/mol/mol/mol/mol) |
|---|---|---|---|---|---|---|
| 10A | 190 | 24 | TiCl$_4$ | VOCl$_3$ | 16 | 40/2.3/0.23/0.46/0 |
| 10B | 190 | 24 | TiCl$_4$ | VOCl$_3$ | 16 | 40/4.6/0.46/0.93/0 |
| 10C | 190 | 24 | TiCl$_4$ | VOCl$_3$ | 16 | 40/4.6/0.46/1.88/0 |
| 11A | 190 | 24 | TiCl$_4$ | VO(O$^n$Pr)$_3$ | 16 | 40/12/1/2/0 |
| 11B | 190 | 24 | TiCl$_4$ | VO(O$^n$Pr)$_3$ | 16 | 40/12/1/1/0 |
| 12A | 190 | 24 | TiCl$_4$ | VO(O$^n$Pr)$_3$ | 16 | 40/12/1/2/0 |
| 12B | 190 | 72 | TiCl$_4$ | VO(O$^n$Pr)$_3$ | 16 | 40/12/1/2/0 |
| 12C | 200 | 24 | TiCl$_4$ | VO(O$^n$Pr)$_3$ | 16 | 40/12/1/2/0 |
| 13 | 190 | 1 | TiCl$_4$ | VOCl$_3$ | 16 | 40/10/1/2/0.5 |
| 14A | 190 | 24 | TiCl$_4$ | — | 16 | 40/2.3/0.23/0/0 |
| 14B | 190 | 24 | TiCl$_4$ | — | 16 | 40/4.7/0.47/0/0 |
| 14C | 190 | 24 | TiCl$_4$ | — | 16 | 40/12/1/0/0 |
| CE6A | — | — | TiCl$_4$ | VOCl$_3$ | 16 | 40/10/1/2/0.5 |
| CE6B | — | — | TiPT | — | 8 | 40/12/3/0/0 |
| CE6C | — | — | TiCl$_4$ | — | 16 | 40/12/1/0/0 |

The ethylene-based polymers collected from the copolymerization reactors for Examples 10A-10C, 11A-11B, 12A-12C, 13, and 14A-14C and Comparative Examples CE6A-CE6B were analyzed for Mw, polydispersity index (PDI), C8 wt. %, HDF wt. %, melt index (I$_2$), and melt flow ratio I$_{10}$/I$_2$, according to the test methods described herein. The results are provided below in Table 7.

TABLE 7

Mw, PDI, C8 wt. %, HDF, I$_2$, and I$_{10}$/I$_2$ Test Data for Examples 10A-10C, 11A, 11B, 12A-12C, 13, and 14A-14C and Comparative Examples CE6A-CE6C

| Sample | Mw (Dalton) | PDI (Mw/Mn) | C8 Content (wt. %) | HDF (wt. %) | I$_2$ (g/10 min) | I$_{10}$/I$_2$ |
|---|---|---|---|---|---|---|
| 10A | 95904 | 3.80 | 8.40 | 13.85 | 1.90 | 6.66 |
| 10B | 94624 | 3.45 | 8.24 | 13.62 | 2.03 | 6.77 |
| 10C | 105519 | 3.64 | 7.36 | 19.18 | 1.36 | 6.67 |
| 11A | 111074 | 3.38 | 7.93 | 16.27 | 1.20 | 6.46 |
| 11B | 92507 | 3.67 | 8.70 | 10.61 | 3.08 | 6.60 |
| 12A | 96103 | 3.36 | 8.37 | 14.79 | 1.97 | 6.76 |
| 12B | 108641 | 3.52 | 7.94 | 17.69 | 1.23 | 6.66 |
| 12C | 96844 | 3.40 | 8.54 | 12.75 | 1.91 | 6.51 |
| 13 | 116638 | 3.69 | 8.78 | 20.75 | 1.02 | 6.60 |
| 14A | 83806 | 3.99 | 8.93 | 10.14 | 3.14 | 7.29 |
| 14B | 87855 | 3.80 | 8.49 | 10.25 | 3.81 | 7.49 |
| 14C | 83428 | 4.18 | 9.07 | 10.80 | 3.28 | 8.39 |
| CE6A | 103409 | 4.26 | 8.39 | 16.31 | 1.43 | 7.01 |
| CE6B | 96537 | 4.48 | 8.32 | 18.17 | 2.05 | 7.51 |
| CE6C | 84649 | 4.24 | 9.95 | 7.88 | 3.08 | 8.17 |

The heterogeneous procatalysts of CE6A-CE6C were all produced with MgCl$_2$ that was not thermally treated. CE6A procatalyst included the VOCl$_3$ vanadium species, and the procatalysts for CE6B and CE6C did not include a vanadium species. Additionally, the CE6B procatalyst had a molar ratio of Ti to MgCl$_2$ of 3:40, and the CE6C procatalyst had a molar ratio of Ti to MgCl$_2$ of 1:40. Under the same batch reactor conditions, the ethylene-based polymer of CE6A exhibited the low I$_{10}$/I$_2$ (around 7). In contrast, the ethylene-based polymer of CE6B had a greater I$_{10}$/I$_2$ of around 7.5, and the ethylene-based polymer of CE6C had an I$_{10}$/I$_2$ of greatre than 8. The ethylene-based polymer of CE6A also exhibited a lower PDI (4.26) compared to the ethylene-based polymer of CE6B (4.48). The ethylene-based polymer of CE6C had the lowest Mw and HDF among the three comparative procatalysts. Although the procatalyst of CE6C produced an ethylene-based polymer with low HDF, the CE6C procatalyst may not be practically applicable due to its too low Mw build.

The heterogeneous procatalyst of Example 13 had the same composition as the comparative procatalyst of CE6A except that Example 13 included the thermally treated MgCl$_2$. The comparison of Example 13 to CE6A demonstrates that incorporating the thermally treated $MgCl_2$ into the heterogeneous procatalyst can produce an ethylene-based polymer having a narrowed molecular weight distribution (MWD), which is shown by the reduction of $I_{10}/I_2$ by 0.4 unit and the reduction of PDI by at least 0.50 unit for the ethylene-based polymer of Example 13 compared to CE6A. Under the same reactor process conditions, the use of the thermally treated $MgCl_2$ also increases the Mw and HDF of the ethylene-based polymer, while keeping a similar comonomer content (C8 wt. %). The heterogeneous procatalyst of Example 13 outperformed the comparative procatalysts of CE6A and CE6B in terms of the MWD of the resulting ethylene-based polymers and produces ethylene-based polymers with greater Mw and C8 wt. % compared to the ethylene-based polymers made with the procatalysts of CE6A and CE6B.

Comparison of Examples 10A-10C to Example 13 demonstrates that a heterogeneous procatalyst that includes the combination of the thermally treated $MgCl_2$ and the $VOCl_3$ species (10A-10C) can produce ethylene-based polymers having the narrowed MWD without incorporating the Zr compound into the heterogeneous procatalyst (Example 13).

Comparison of Example 10A to Example 14A and comparison of Example 10B to Example 14B demonstrate that the addition of $VOCl_3$ to the heterogeneous procatalyst having the thermally treated $MgCl_2$ (e.g., Examples 10A and 10B) may produce ethylene-based polymers with decreased PDI and $I_{10}/I_2$ if no other vanadium compounds are used. Additionally, the addition of $VOCl_3$ to the heterogeneous procatalyst having the thermally treated $MgCl_2$ may significantly increase the Mw and HDF and slightly decrease the C8 wt. % of the ethylene-based polymers compared the heterogeneous procatalysts that do not include the $VOCl_3$.

Comparison of Example 10B to Example 10C demonstrates that increasing the amount of $VOCl_3$ in the heterogeneous procatalyst may increase the Mw and HDF and slightly decrease the C8 wt. % of the ethylene-based polymers produced. Thus, it is shown that controlling the amount of the vanadium species in the heterogeneous procatalyst may enable fine tuning and control of the HDF of the ethylene-based polymers to achieve a desired optical/tear property balance of the final LLDPE film product.

Comparison of Example 10A to Example 10B demonstrates that an ethylene-based polymer having a narrowed MWD (i.e., low PDI and $I_{10}/I_2$) can be obtained with a heterogeneous procatalyst having an EADC/Ti/V loading as low as 2.3/0.23/0.46 per 40 equivalent moles of the thermally treated $MgCl_2$.

Comparison of Example 11B to Example 14C demonstrates that if $VOCl_3$ is not used, an ethylene-based polymer having a narrowed MWD can be produced by incorporating $VO(O''Pr)_3$ into the heterogeneous procatalyst having the thermally treated $MgCl_2$ (Example 11B). In addition to narrowing the MWD (i.e., reducing the PDI and $I_{10}/I_2$) of the ethylene-based polymers, including $VO(O''Pr)_3$ in the heterogeneous procatalyst may also increase the Mw of the ethylene-based polymers. The use of $VO(O''Pr)_3$ instead of $VOCl_3$ in the heterogeneous procatalyst may also reduce the concentration of free chlorine in the catalyst, which reduces the free chlorine concentration in the ethylene-based polymer produced.

Comparison of Example 11A to 11B demonstrates that, under the same reaction conditions with all other concentrations fixed, increasing the amount of $VO(O''Pr)_3$ in the heterogeneous procatalyst may increase the Mw and HDF and decrease the C8 wt. % of the ethylene-based polymers produced. The PDI and $I_{10}/I_2$ of the ethylene-based polymers of Examples 11A and 11B were maintained at low levels even though the amount of the $VO(O''Pr)_3$ heterogeneous procatalyst was changed.

The performance of the heterogeneous procatalyst of Example 13 demonstrates that the length of the process time of the thermal treatment of the $MgCl_2$ can be as short as 1 hour or less at 190° C. Comparison of Examples 12A and 12C demonstrates that as long as the thermal treatment is performed on the $MgCl_2$, the process temperature at which the thermal treatment is conducted does not have a significant impact on the properties of the ethylene-based polymers produced using the heterogeneous procatalyst.

Comparison of Examples 10A-10C, 11A, 11B, and 12A-12C to Example 13 demonstrates that including the thermally treated $MgCl_2$ in the heterogeneous procatalyst enables production of ethylene-based polymers with narrowed MWD without including Zr in the heterogeneous procatalyst, as long as a vanadium species is included in the heterogeneous procatalyst.

Comparison of Examples 10A-10C, 11A, 11B, and 12A-12C to Comparative Examples CE6A and CE6B demonstrates that the heterogeneous procatalyst that includes the thermally treated $MgCl_2$ and a vanadium species (e.g., Examples 10A-10C, 11A, 11B, and 12A-12C) can produce ethylene-based polymers (e.g., LLDPE) with significantly narrowed MWD (i.e., a PDI of less than 4 and an $I_{10}/I_2$ of less than 7) compared to ethylene-based polymers produced with the procatalyst of CE6A (vanadium species and non-thermally treated $MgCl_2$) and ethylene-based polymers produced with the procatalyst of CE6B (no vanadium species and non-thermally treated $MgCl_2$. Additionally, by utilizing the heterogeneous procatalyst having the termally treated $MgCl_2$ and the vanadium species, the HDF of the ethylene-based polymer can be tuned and controlled over a relatively large range (e.g., 10-20 wt. %) with the same reactor process conditions to control the optical/tear property balance of the final LLDPE film.

In a first aspect of the present disclosure, a heterogeneous procatalyst may include a titanium species, a chlorinating agent, and a thermally-treated magnesium chloride component. The chlorinating agent may have a structure $A(Cl)_x(R^1)_{3-x}$, where A is aluminum or boron, $R^1$ is a $(C_1-C_{30})$ hydrocarbyl, and x is 1, 2, or 3.

A second aspect of the present disclosure may include the first aspect, wherein the thermally treated magnesium chloride component comprises a product of thermally treating a magnesium chloride slurry at a temperature of at least 100° C. for at least 30 minutes. The magnesium chloride slurry may include at least magnesium chloride dispersed in a solvent.

A third aspect of the present disclosure may include the second aspect, wherein the magnesium chloride slurry comprises the titanium species and the chlorinating agent.

A fourth aspect of the present disclosure may include the first aspect, wherein the heterogeneous procatalyst may include the product of thermally treating a slurry of magnesium chloride dispersed in a solvent at a temperature of at least 100° C. for at least 30 minutes and combining the titanium species and the chlorinating agent with the thermally treated magnesium chloride.

A fifth aspect of the present disclosure may include the first aspect, wherein the heterogeneous procatalyst comprises the product of combining the titanium species and the chlorinating agent with a slurry of magnesium chloride dispersed in a solvent to produce a procatalyst slurry and thermally treating the procatalyst slurry at a temperature of at least 100° C. for at least 30 minutes.

A sixth aspect of the present disclosure may include any of the first through fifth aspects, wherein the titanium species comprises a titanium species having catalytic activity.

A seventh aspect of the present disclosure may include any of the first through sixth aspects, wherein a molar ratio of titanium to magnesium chloride in the heterogeneous procatalyst is from 0.0050 to 0.075 (mole/mole).

An eighth aspect of the present disclosure may include any of the first through seventh aspects, further comprising a vanadium species.

A ninth aspect of the present disclosure may include the eighth aspect, wherein the vanadium species is chosen from $VX_4$, $VOX_3$, or $VO(OR^2)_3$, where each X is independently a halogen atom or $(C_1-C_{40})$ heterohydrocarbyl anion; and $R^2$ is $(C_1-C_{20})$ hydrocarbyl or $—C(O) R^{11}$, where $R^{11}$ is $(C_1-C_{30})$ hydrocarbyl.

A tenth aspect of the present disclosure may include either of the eighth or ninth aspects, wherein the ratio of vanadium to titanium in the heterogeneous procatalyst is from 0.0 to 20 (mole/mole).

An eleventh aspect of the present disclosure may include any of the eighth through tenth aspects, wherein the molar ratio of vanadium to magnesium chloride in the heterogeneous procatalyst is from 0.0 to 0.10 (mole/mole).

A twelfth aspect of the present disclosure may include any of the first through eleventh aspects, in which a process for polymerizing ethylene-based polymers may include contacting ethylene and optionally one or more α-olefins in the presence of a catalyst system, wherein the catalyst system comprises the heterogeneous procatalyst according to any of the first through eleventh aspects of the present disclosure to produce an ethylene-based polymer.

A thirteenth aspect of the present disclosure may include the twelfth aspect, wherein the catalyst system further comprises a co-catalyst.

A fourteenth aspect of the present disclosure may include the thirteenth aspect, wherein the co-catalyst is chosen from an alkyl of aluminum, a haloalkyl of aluminum, an alkylaluminum halide, a Grignard reagent, an alkali metal aluminum hydride, an alkali metal borohydride, an alkali metal hydride, or an alkaline earth metal hydride.

A fifteenth aspect of the present disclosure may include an ethylene-based polymer prepared by the process in any of the twelfth through fourteenth aspects.

In a sixteenth aspect of the present disclosure, a process for making a procatalyst may include thermally treating a magnesium chloride slurry at a treatment temperature of at least 100° C. and for at least 30 minutes, the magnesium chloride slurry comprising at least magnesium chloride ($MgCl_2$) dispersed in a solvent. The process may further include combining a chlorinating agent and a titanium species with the magnesium chloride slurry. The chlorinating agent may have a structure $A(Cl)_x(R^1)_{3-x}$, where A is aluminum or boron, $R^1$ is $(C_1-C_{30})$hydrocarbyl, and x is 1, 2, or 3.

A seventeenth aspect of the present disclosure may include the sixteenth aspect, comprising thermally treating the magnesium chloride slurry before combining the chlorinating agent and the titanium species with the magnesium chloride slurry.

An eighteenth aspect of the present disclosure may include the sixteenth aspect, comprising thermally treating the magnesium chloride slurry after combining the chlorinating agent and the titanium species with the magnesium chloride slurry.

A nineteenth aspect of the present disclosure may include any of the sixteenth through eighteenth aspects, wherein thermally treating the magnesium chloride slurry comprises agitating the magnesium chloride slurry.

A twentieth aspect of the present disclosure may include any of the sixteenth through nineteenth aspects, further comprising combining a vanadium species with the magnesium chloride, titanium species, and the chlorinating agent.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:
1. A heterogeneous procatalyst comprising:
   a titanium species;
   a chlorinating agent having a structure $A(Cl)_x(R^1)_{3-x}$, where:
      A is aluminum or boron;
      $R^1$ is a $(C_1-C_{30})$ hydrocarbyl; and
      x is 1, 2, or 3; and
   a thermally treated magnesium chloride ($MgCl_2$) component, wherein the thermally treated magnesium chloride component comprises a product of thermally treating a magnesium chloride slurry at a temperature of at least 150° C. for at least 30 minutes;
   wherein:
      a molar ratio of the chlorinating agent to the thermally treated $MgCl_2$ component in the heterogeneous procatalyst is from 3:40 to 14:40; and
      a molar ratio of the titanium species to the thermally treated $MgCl_2$ component in the heterogeneous procatalyst is from 0.5:40 to 5:40.

2. The heterogeneous procatalyst of claim 1, wherein the magnesium chloride slurry comprises at least magnesium chloride dispersed in a solvent.

3. The heterogeneous procatalyst of claim 2, wherein the magnesium chloride slurry comprises the titanium species and the chlorinating agent.

4. The heterogeneous procatalyst of claim 1, further comprising a vanadium species chosen from $VX_4$, $VOX_3$, or $VO(OR^2)_3$, where each X is independently a halogen atom or $(C_1-C_{40})$ heterohydrocarbyl anion; and $R^2$ is $(C_1-C_{20})$ hydrocarbyl or $—C(O) R^{11}$, where $R^{11}$ is $(C_1-C_{30})$ hydrocarbyl.

5. The heterogeneous procatalyst according to claim 4, wherein a ratio of vanadium to titanium in the heterogeneous procatalyst is from 0.0 to 20 (mole/mole).

6. The heterogeneous procatalyst of claim 4, wherein a molar ratio of vanadium to magnesium chloride in the heterogeneous procatalyst is from 0.0 to 0.10 (mole/mole).

7. A process for preparing an ethylene-based polymer, the process comprising contacting ethylene and optionally one or more α-olefins in the presence of a catalyst system to produce an ethylene-based polymer, wherein the catalyst system comprises the heterogeneous procatalyst according to claim 1 and an optional co-catalyst chosen from an alkyl of aluminum, a haloalkyl of aluminum, an alkylaluminum halide, a Grignard reagent, an alkali metal aluminum hydride, an alkali metal borohydride, an alkali metal hydride, or an alkaline earth metal hydride.

8. An ethylene-based polymer prepared by the process according to claim 7.

9. A process for making a procatalyst, the process comprising:

thermally treating a magnesium chloride slurry at a treatment temperature of at least 100° C. and for at least 30 minutes, the magnesium chloride slurry comprising at least magnesium chloride ($MgCl_2$) dispersed in a solvent; and combining a chlorinating agent and a titanium species with the magnesium chloride slurry, the chlorinating agent having a structure $A(Cl)_x(R^1)_{3-x}$, where:

A is aluminum or boron;

$R^1$ is $(C_1-C_{30})$hydrocarbyl; and x is 1, 2, or 3;

wherein:

a molar ratio of the chlorinating agent to the thermally treated $MgCl_2$ component in the heterogeneous procatalyst is from 3:40 to 14:40; and a molar ratio of the titanium species to the thermally treated $MgCl_2$ component in the heterogeneous procatalyst is from 0.5:40 to 5:40.

10. The process according to claim 9, comprising thermally treating the magnesium chloride slurry after combining the chlorinating agent and the titanium species with the magnesium chloride slurry.

11. The process of claim 9, further comprising combining a vanadium species with the magnesium chloride, titanium species, and the chlorinating agent.

12. A process for making a procatalyst, the process comprising:

thermally treating a magnesium chloride slurry at a treatment temperature of at least 100° C. and for at least 30 minutes, the magnesium chloride slurry comprising at least magnesium chloride ($MgCl_2$) dispersed in a solvent; and combining a chlorinating agent and a titanium species with the magnesium chloride slurry, the chlorinating agent having a structure $A(Cl)_x(R^1)_{3-x}$, where:

A is aluminum or boron;

$R^1$ is $(C_1-C_{30})$hydrocarbyl; and x is 1, 2, or 3;

wherein thermally treating the magnesium chloride slurry occurs before combining the chlorinating agent and the titanium species with the magnesium chloride slurry.

13. The process according to claim 12, further comprising combining a vanadium species with the magnesium chloride, titanium species, and the chlorinating agent.

* * * * *